(12) United States Patent
Varma et al.

(10) Patent No.: US 10,620,802 B1
(45) Date of Patent: Apr. 14, 2020

(54) ALGORITHMIC MODELING INTERFACE PROCESS

(71) Applicant: Cadence Design Systems, Inc., San Jose, CA (US)

(72) Inventors: Ambrish Kant Varma, Chelmsford, MA (US); Kumar Chidhambara Keshavan, Medford, MA (US); Delong Cai, Shanghai (CN); Kenneth R. Willis, Matthews, NC (US); Bradford C. Griffin, Londonderry, NH (US); Xuegang Zeng, Westborough, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 644 days.

(21) Appl. No.: 14/822,086

(22) Filed: Aug. 10, 2015

(51) Int. Cl.
*G06F 3/0484* (2013.01)
*G06F 30/00* (2020.01)
*G06F 40/186* (2020.01)

(52) U.S. Cl.
CPC .......... *G06F 3/04842* (2013.01); *G06F 30/00* (2020.01); *G06F 40/186* (2020.01)

(58) Field of Classification Search
CPC .. G06F 17/00; G06F 17/227; G06F 17/30076; G06F 2217/08; G06F 17/5036; G06F 17/5045; G06F 9/543; G06F 17/5022; G06F 17/5054; G06F 17/5081; G06F 9/44521; G06F 9/45504; G06F 8/35; G06F 16/90335; G06F 16/904; G06F 16/9535; G06F 17/5009; G06F 2217/16; G06F 3/04842; G06F 8/24; G06F 3/0486; G06F 11/076; G06F 11/2221; G06F 11/263; G06F 11/273; G06F 11/3027; G06Q 10/06;
(Continued)

(56) References Cited

U.S. PATENT DOCUMENTS 6,026,127 A * 2/2000 Lewicki .............. H04L 25/4925
330/285
6,263,015 B1 * 7/2001 Awata .................. H04M 19/008
320/140

(Continued)

OTHER PUBLICATIONS

"IBIS, I/O Buffer Information Specification, Version 6.0," http://www.eda.org/ibis/ver6.0/ver6_0.pdf, 235 pages (Sep. 20, 2013).

*Primary Examiner* — Renee D Chavez
*Assistant Examiner* — Carl P Lobo
(74) *Attorney, Agent, or Firm* — Mark H. Whittenberger, Esq.

(57) ABSTRACT

The present disclosure relates to a system and method for algorithmic modeling interface ("AMI") model development. Embodiments may include enabling a selection from a plurality of templates associated with an advanced equalization algorithm at a graphical user interface. Embodiments may further include receiving a selection of at least one of the plurality of templates at the graphical user interface and displaying a selected template at the graphical user interface. Embodiments may also include allowing a user to edit one or more parameters associated with the selected template at the graphical user interface and generating an algorithmic modeling interface ("AMI") model based upon, at least in part, the selected template and the one or more parameters.

18 Claims, 20 Drawing Sheets

(58) Field of Classification Search
CPC . H04L 69/08; H04L 2012/6459; H04L 67/00;
H04L 65/103; H04L 67/125; H04L 1/242;
H04L 43/50; G06N 10/00; G06N 3/0454;
G06N 3/08; G06N 5/025
See application file for complete search history.

(56) References Cited

U.S. PATENT DOCUMENTS

| | | | | |
|---|---|---|---|---|
| 6,401,230 | B1* | 6/2002 | Ahanessians | G06F 17/5045 716/102 |
| 6,530,065 | B1* | 3/2003 | McDonald | G06F 17/5036 716/102 |
| 6,690,739 | B1* | 2/2004 | Mui | H04L 1/0054 375/265 |
| 7,076,751 | B1* | 7/2006 | Nixon | G06F 17/5054 716/112 |
| 7,206,967 | B1* | 4/2007 | Marti | G01R 31/318364 714/25 |
| 7,283,988 | B1* | 10/2007 | Peterson | G06F 9/5083 |
| 7,444,603 | B1* | 10/2008 | Kelly | G06F 17/5045 716/103 |
| 7,693,691 | B1* | 4/2010 | Tao | G06F 17/5009 375/267 |
| 7,876,866 | B1* | 1/2011 | McAdam | H04L 7/0083 375/220 |
| 8,060,818 | B2* | 11/2011 | Wang | G06F 17/211 715/221 |
| 8,196,075 | B1* | 6/2012 | Garrault | G06F 17/5036 716/104 |
| 8,453,102 | B1* | 5/2013 | Pack | G06F 17/505 716/139 |
| 8,560,294 | B1* | 10/2013 | Ren | G06F 17/5036 703/14 |
| 8,611,406 | B2* | 12/2013 | Dai | G01R 31/3171 375/224 |
| 8,670,997 | B2* | 3/2014 | Krishnan | G06Q 10/10 705/2 |
| 8,776,015 | B1* | 7/2014 | Hosagrahara | G06F 8/34 717/105 |
| 8,893,068 | B1* | 11/2014 | Kho | G06F 17/50 716/106 |
| 8,958,512 | B1* | 2/2015 | Ding | H04L 25/03057 375/229 |
| 9,178,542 | B1* | 11/2015 | Shimanouchi | H04L 25/03343 |
| 9,378,065 | B2* | 6/2016 | Shear | H04L 47/70 |
| 9,473,138 | B2* | 10/2016 | Cai | H03K 19/00346 |
| 9,768,889 | B2* | 9/2017 | Fine | H04B 14/02 |
| 9,798,848 | B1* | 10/2017 | Keshavan | G06F 17/5081 |
| 9,846,571 | B1* | 12/2017 | Venkataramani | G06F 11/3672 |
| 9,928,318 | B1* | 3/2018 | Kukal | G06F 30/33 |
| 10,419,132 | B2* | 9/2019 | Fine | H04L 43/028 |
| 10,496,767 | B1* | 12/2019 | Keshavan | G06F 30/20 |
| 2002/0082825 | A1* | 6/2002 | Rowlandson | G06F 17/274 704/9 |
| 2003/0016770 | A1* | 1/2003 | Trans | H04B 1/00 375/346 |
| 2004/0032426 | A1* | 2/2004 | Rutledge | G06F 19/322 715/764 |
| 2004/0165533 | A1* | 8/2004 | Izundu | H04L 41/0654 370/241 |
| 2005/0089089 | A1* | 4/2005 | Anim-Appiah | H04L 25/03343 375/232 |
| 2005/0135513 | A1* | 6/2005 | Kang | H03G 3/3036 375/345 |
| 2005/0169412 | A1* | 8/2005 | Yang | H04L 25/03197 375/350 |
| 2006/0041502 | A1* | 2/2006 | Blair | G06F 17/227 705/37 |
| 2006/0156221 | A1* | 7/2006 | Chen | G06F 17/2247 715/209 |
| 2007/0067397 | A1* | 3/2007 | Tran | G06Q 10/107 709/206 |
| 2007/0177684 | A1* | 8/2007 | Halbauer | H04L 27/2665 375/260 |
| 2009/0006154 | A1* | 1/2009 | Hao | G06Q 10/06 705/7.26 |
| 2009/0150838 | A1* | 6/2009 | Huang | G06F 17/5027 716/106 |
| 2009/0150839 | A1* | 6/2009 | Huang | G06F 17/5027 716/106 |
| 2009/0262792 | A1* | 10/2009 | Huang | H04L 25/03006 375/224 |
| 2010/0057603 | A1* | 3/2010 | Janowski | G06Q 40/04 705/37 |
| 2010/0057634 | A1* | 3/2010 | Janowski | G06Q 30/02 705/36 R |
| 2010/0214417 | A1* | 8/2010 | Gennari | G08B 13/19645 348/159 |
| 2011/0035204 | A1* | 2/2011 | Smirnov | G06F 17/505 703/14 |
| 2011/0037759 | A1* | 2/2011 | Fukuda | G09G 5/006 345/213 |
| 2011/0069692 | A1* | 3/2011 | Palkovic | H04L 27/2647 370/342 |
| 2011/0107252 | A1* | 5/2011 | Balaram | G06F 17/5036 715/773 |
| 2012/0044983 | A1* | 2/2012 | Kerr | H04L 25/03057 375/233 |
| 2013/0107935 | A1* | 5/2013 | Zhou | H04L 25/03063 375/233 |
| 2013/0152047 | A1* | 6/2013 | Moorthi | G06F 11/368 717/124 |
| 2013/0263084 | A1* | 10/2013 | Kesavan | G06F 8/30 717/106 |
| 2013/0332101 | A1* | 12/2013 | Pickerd | G06F 11/30 702/119 |
| 2014/0025350 | A1* | 1/2014 | Dai | G06F 17/5036 703/2 |
| 2014/0050485 | A1* | 2/2014 | Masarik | H04B 10/1143 398/117 |
| 2014/0075004 | A1* | 3/2014 | Van Dusen | H04L 41/04 709/223 |
| 2014/0214396 | A1* | 7/2014 | Adir | G06F 17/5009 703/21 |
| 2014/0282125 | A1* | 9/2014 | Duneau | G06F 3/0481 715/762 |
| 2015/0066450 | A1* | 3/2015 | Charlesworth | G06F 17/5009 703/2 |
| 2015/0127877 | A1* | 5/2015 | Novellini | G06F 13/4282 710/316 |
| 2015/0326348 | A1* | 11/2015 | Shen | H04L 1/0041 714/776 |
| 2016/0050030 | A1* | 2/2016 | Riedl | H04B 11/00 367/133 |
| 2016/0253446 | A1* | 9/2016 | Chong | G06F 17/5036 716/136 |
| 2016/0321381 | A1* | 11/2016 | English | G06F 17/5009 |
| 2017/0155424 | A1* | 6/2017 | Feyh | H04B 3/04 |
| 2018/0107775 | A1* | 4/2018 | Xu | G06F 17/5036 |

* cited by examiner

ALGORITHMIC MODELING INTERFACE PROCESS

FIELD OF THE INVENTION

The present disclosure relates to electronic design automation (EDA), and more specifically, to a method for graphical user interface (GUI) based algorithmic model development.

DISCUSSION OF THE RELATED ART

EDA utilizes software tools that may be used in the design and analysis of numerous electronic systems such as printed circuit boards (PCBs) and integrated circuits (ICs). Some EDA tools include Algorithmic Modeling Interface (AMI) models, which may be necessary to model the advanced equalization algorithms needed for high speed simulations for both serializer/deserializer ("SERDES") and memory devices, as described in the latest industry specifications such as Peripheral Component Interconnect Express 4.0 ("PCIe4"), Fiber Channel, Serial Attached SCSI ("SAS"), Universal Serial Bus ("USB3.1"), Mobile Industry Processor Interface ("MIPI"), double data rate fourth generation synchronous dynamic random-access memory ("DDR4"), etc. AMI models may be created by writing C/C++ code from scratch by following the application program interface ("API") described in the I/O Buffer Information specification ("IBIS"). This code may then be compiled to make a dynamic linked library ("dll") which interacts with the EDA tool to perform the desired operations. While writing code for a compiled .dll is certainly viable and feasible, it is not an easy task to model complex equalization algorithms and adaptation schemes. Writing an AMI model from scratch requires extensive programming and electrical engineering knowledge and an extremely long ramp up time in order to build a reusable library/database.

SUMMARY OF INVENTION

In one or more embodiments of the present disclosure, a computer-implemented method for AMI model development is provided. The method may include enabling a selection from a plurality of templates associated with an advanced equalization algorithm at a graphical user interface. The method may further include receiving a selection of at least one of the plurality of templates at the graphical user interface and displaying a selected template at the graphical user interface. The method may also include allowing a user to edit one or more parameters associated with the selected template at the graphical user interface and generating an algorithmic modeling interface ("AMI") model based upon, at least in part, the selected template and the one or more parameters.

One or more of the following features may be included. In some embodiments, the method may include generating an AMI file based upon, at least in part, the selected template and the one or more parameters. The method may also include storing an associated portion of code for each of the plurality of templates. In some embodiments, storing an associated portion of code may include storing a user-customized portion of code. The method may further include allowing a user to edit the stored user-customized portion of code. The method may also include displaying the algorithmic modeling interface ("AMI") model at the graphical user interface. The method may include displaying an AMI-based wizard at the graphical user interface. The AMI-based wizard may be configured to present one or more questions to the user. The method may further include providing one or more user responses to an AMI-engine. Generating an algorithmic modeling interface ("AMI") model may be based upon, at least in part, the one or more user responses.

In some embodiments, a computer-readable storage medium for electronic design simulation is provided. The computer-readable storage medium may have stored thereon instructions that when executed by a machine result in one or more operations. Operations may include enabling a selection from a plurality of templates associated with an advanced equalization algorithm at a graphical user interface. Operations may further include receiving a selection of at least one of the plurality of templates at the graphical user interface and displaying a selected template at the graphical user interface. Operations may also include allowing a user to edit one or more parameters associated with the selected template at the graphical user interface and generating an algorithmic modeling interface ("AMI") model based upon, at least in part, the selected template and the one or more parameters.

One or more of the following features may be included. In some embodiments, the method may include generating an AMI file based upon, at least in part, the selected template and the one or more parameters. Operations may also include storing an associated portion of code for each of the plurality of templates. In some embodiments, storing an associated portion of code may include storing a user-customized portion of code. Operations may further include allowing a user to edit the stored user-customized portion of code. Operations may also include displaying the algorithmic modeling interface ("AMI") model at the graphical user interface. Operations may include displaying an AMI-based wizard at the graphical user interface. The AMI-based wizard may be configured to present one or more questions to the user.

In one or more embodiments of the present disclosure, a system may include a computing device having at least one processor configured to enable a selection from a plurality of templates associated with an advanced equalization algorithm at a graphical user interface, the at least one processor further configured to receive a selection of at least one of the plurality of templates at the graphical user interface and to display a selected template at the graphical user interface, the at least one processor further configured to allow a user to edit one or more parameters associated with the selected template at the graphical user interface and to generate an algorithmic modeling interface ("AMI") model based upon, at least in part, the selected template and the one or more parameters.

One or more of the following features may be included. In some embodiments, the at least one processor may be further configured to generate an AMI file based upon, at least in part, the selected template and the one or more parameters. The at least one processor may be further configured to execute one or more instructions to store an associated portion of code for each of the plurality of templates Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Embodiments of AMI process 10 shown in FIGS. 1-20 may provide a graphical user interface (GUI), referred to herein as an "AMI Builder", which may utilize an extensive library of equalization schemes and algorithms in a back-end system as well as a user-friendly front end system (e.g. drag and drop, etc.) to generate both an AMI model (e.g., .dll) and its companion file (e.g., .ami) without ever requiring a user to write a line of code. As is discussed in further detail below, embodiments of AMI process 10 may also include a wizard on the front end that presents questions to the user efficiently to assist in AMI model generation. Accordingly, the AMI wizard may be in communication with an engine at the backend system that may be configured to translate those questions into an AMI model (.dll) and its companion file (.ami), including any parameter settings, thus removing any code writing requirements.

Figure 1:
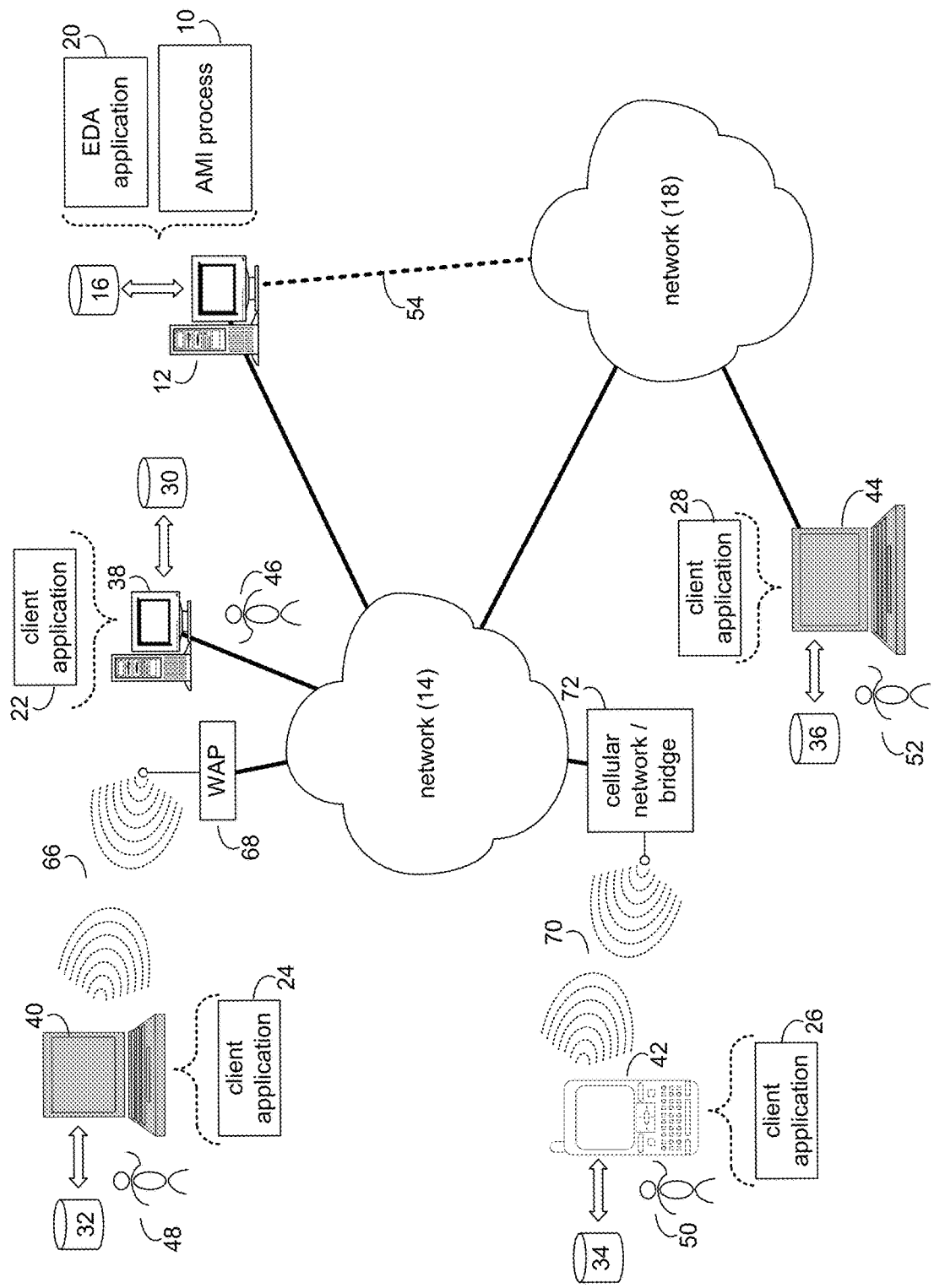
FIG. 1 is a system diagram depicting aspects of the AMI process in accordance with an embodiment of the present disclosure.

Referring to FIG. 1, there is shown AMI process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the AMI process may reside on and be executed, in whole or in part, by a client electronic device, such as a personal computer, notebook computer, personal digital assistant, or the like.

The instruction sets and subroutines of AMI process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

AMI process 10 may be a stand-alone application, or may be an applet/application/script that may interact with and/or be executed within EDA application 20. In addition/as an alternative to being a server-side process, the AMI process may be a client-side process (not shown) that may reside on a client electronic device (described below) and may interact with an EDA client application (e.g., one or more of EDA client applications 22, 24, 26, 28). Further, the AMI process may be a hybrid server-side/client-side process that may interact with EDA application 20 and an EDA client application (e.g., one or more of client applications 22, 24, 26, 28). As such, the AMI process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize AMI process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

As used herein, "AMI" may refer to an Algorithmic Modeling Interface, "DDR" may refer to Dual Data Rate, "DLL" may refer to a Dynamic Linked Library, "GBPS" may refer to Giga Bits Per Second, "IO" may refer to Input/Output, "IBIS" may refer to the IO Buffer Information Specification, "BER" may refer to Bit Error Rate, "SERDES" may refer to Serializer/Deserializer, "Rx" and "Tx" may refer to a receiver and transmitter, respectively.

Figure 2:
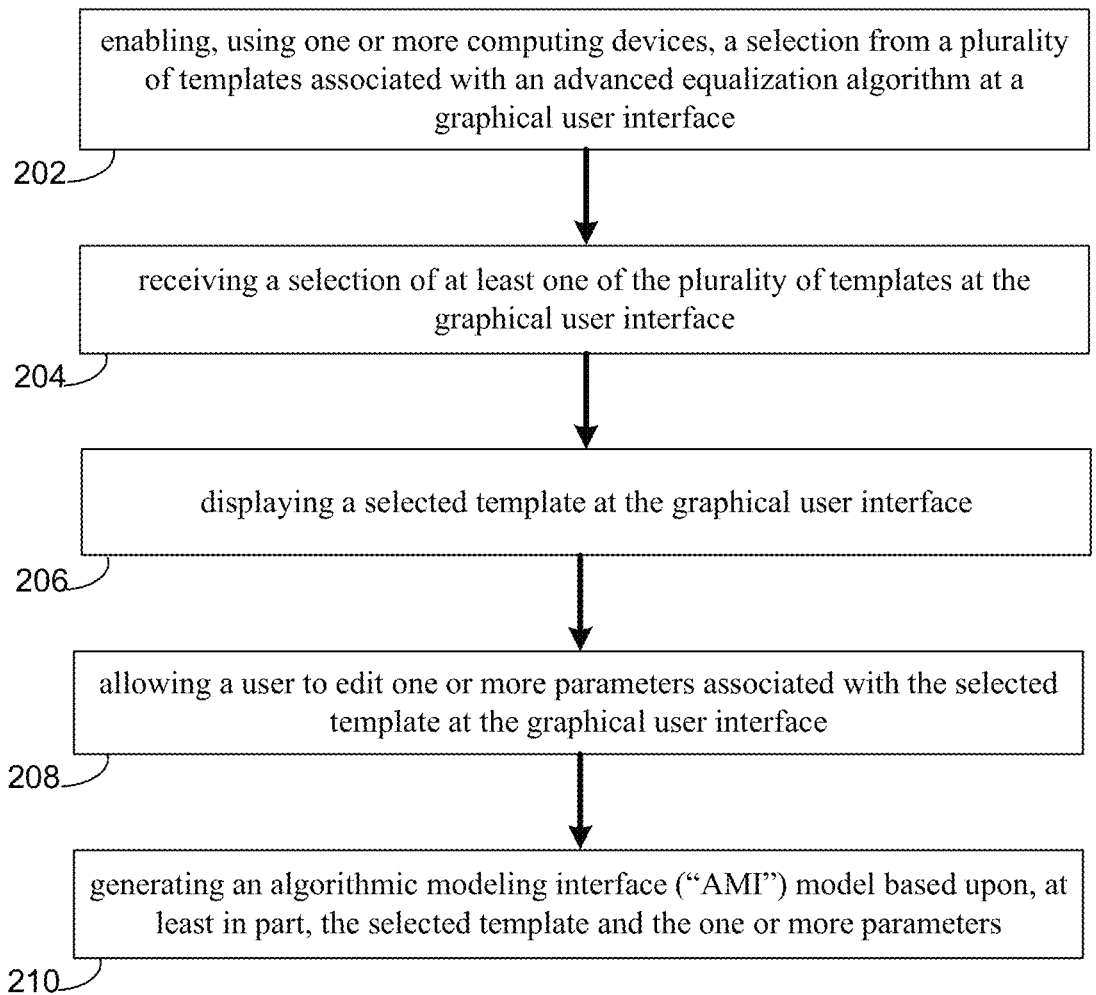
FIG. 2 is a flowchart depicting operations consistent with the AMI process of the present disclosure.

Referring to FIGS. 2-20, various embodiments consistent with AMI process 10 are provided. As shown in FIG. 2, embodiments of AMI process 10 may include enabling (202) a selection from a plurality of templates associated with an advanced equalization algorithm at a graphical user interface. Embodiments may further include receiving (204) a selection of at least one of the plurality of templates at the graphical user interface and displaying (206) a selected template at the graphical user interface. Embodiments may also include allowing (208) a user to edit one or more parameters associated with the selected template at the graphical user interface and generating (210) an algorithmic modeling interface ("AMI") model based upon, at least in part, the selected template and the one or more parameters.

Embodiments of AMI process 10 may include an AMI Builder, which may include one or more graphical user interfaces that may be configured to generate unique AMI models. As is discussed in further detail herein below, the AMI Builder may be accessible and/or associated with one or more client applications such as client applications 22, 24, 26, and 28, which may be accessible via client electronic devices 38, 40, 42, 44 shown in FIG. 1. In operation, AMI process 10 may enable a user to drop 'modules' on a canvas, which may be associated with a client or EDA application, and may also allow the user to edit the parameters for that module. Accordingly, using AMI process 10 a user may have the ability to compile and generate an AMI model (e.g., .dll) with minimal effort (e.g., the click of a button, etc.). In this way, AMI process 10 may be configured to write any required code, call the compiler that may be present on the user's computer and compile the .dll based on the user's platform and operating system. Although examples included herein may mention the "C" programming language, it should be noted that any suitable language may be incorporated into this disclosure.

Figure 3:
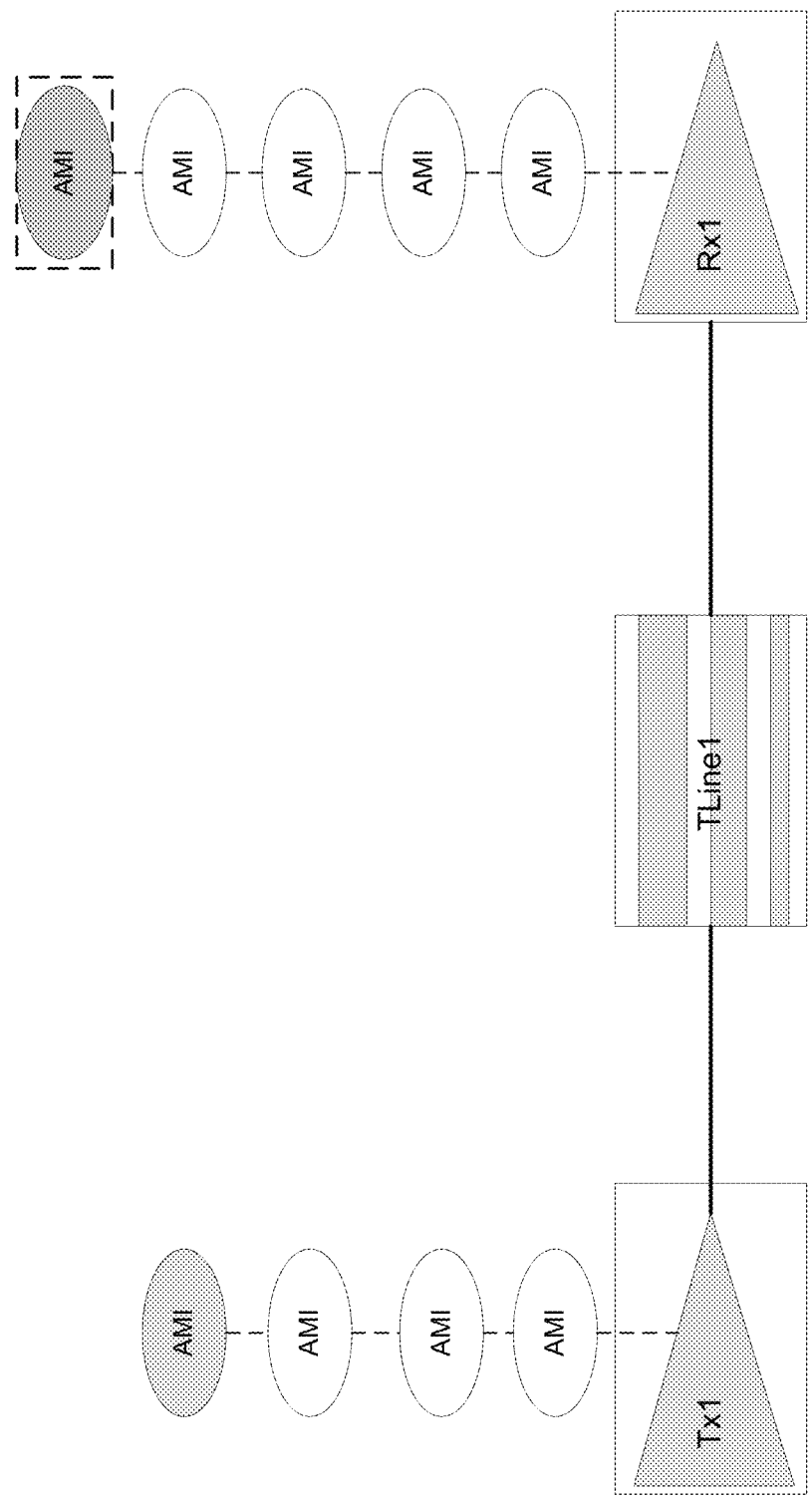
FIG. 3 is a schematic depicting aspects of the AMI process in accordance with an embodiment of the present disclosure.

In some embodiments, and as shown in FIG. 3, GUI 300 may be configured to provide access to an extensive library of equalization schemes and algorithms, such as those available via various EDA applications (e.g. EDA application 20 shown in FIG. 1), EDA databases 16, and libraries. In some instances, the graphical user interfaces described below may allow for a drag and drop front end to generate the AMI model (.dll) and its companion file (.ami) without ever writing one line of code.

In some embodiments, AMI process 10 may be configured to store, edit and/or access this library of equalization schemes and algorithms, which may also be referred to as AMI IP building blocks. These AMI IP building blocks and algorithms may be used to make numerous AMI models. The building blocks have been refined over many years and new algorithms/building blocks may be updated continuously.

In some embodiments, AMI process 10 may be configured to store an associated portion of code for one or more templates, which may be used to generate an AMI model. Storing these AMI templates may provide for easy re-use and faster reproduction of AMI models. This may be particularly beneficial for minor changes/revisions of the model. For example, each template and associated portion of code may be stored using any suitable storage device, such as storage device 16 shown in FIG. 1. AMI process 10 may also allow each user to store a user-customized portion of code. For example, a user may want to edit a code portion associated with a given module or template and store that edited portion for future use. Accordingly, AMI process 10 may allow the user to customize parameters, defaults, names, description, etc. for each module to make an AMI model based on his/her needs. Additionally and/or alternatively, AMI process 10 may allow the user sufficient flexibility such that if they do want to integrate their own 'modules' or custom code with the modules that are provided with the AMI Builder, they can easily do that from the GUI.

In some embodiments, templates may include one or more lines of text to instruct the AMI builder about how to deviate from the default settings in the AMI Builder. In this way, the user may easily transport the AMI Model settings instead of the actual code. This is very convenient, and saves computer disk space as well, in order to save the various versions of an AMI model. Only a subset of the parameters may be used in templates instead of the entire library. This reduces complexity and increases the efficiency when developing AMI models.

Figure 4:
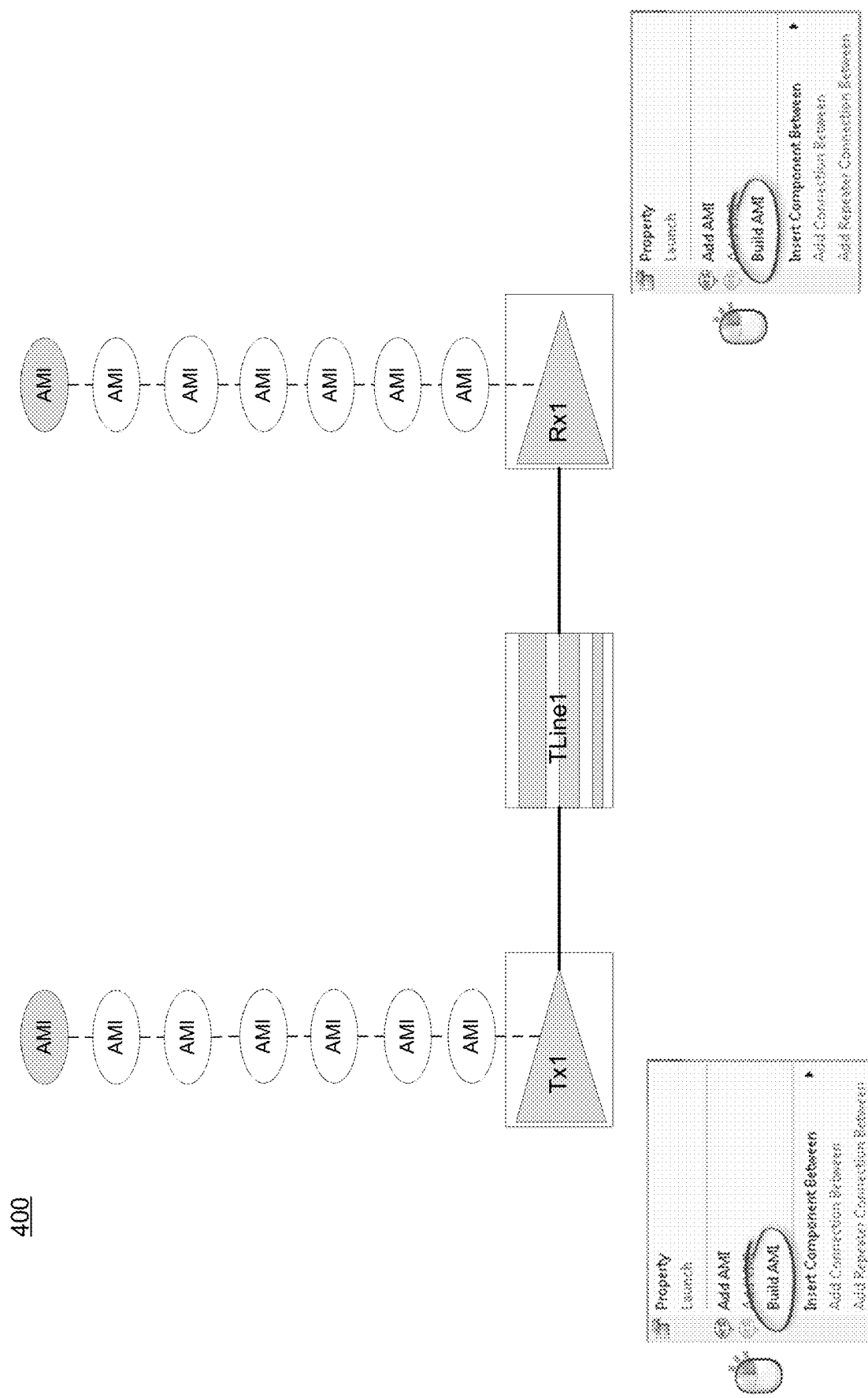
FIG. 4 is a schematic depicting aspects of the AMI process in accordance with an embodiment of the present disclosure.

Referring also to FIGS. 3-4, embodiments depicting a GUI 300 that may be rendered in association with AMI process 10 is provided. In operation, and as shown in FIG. 4, a user may access the AMI Builder GUI 400 through the Tx1 or the Rx1 on the EDA application canvas (e.g. those available from the Assignee of the present disclosure, other EDA applications, etc.). Upon selecting the "Build AMI" option, AMI process 10 may be configured to display the AMI interfaces provided in FIGS. 5-8, which are discussed in further detail hereinbelow.

Figure 5:
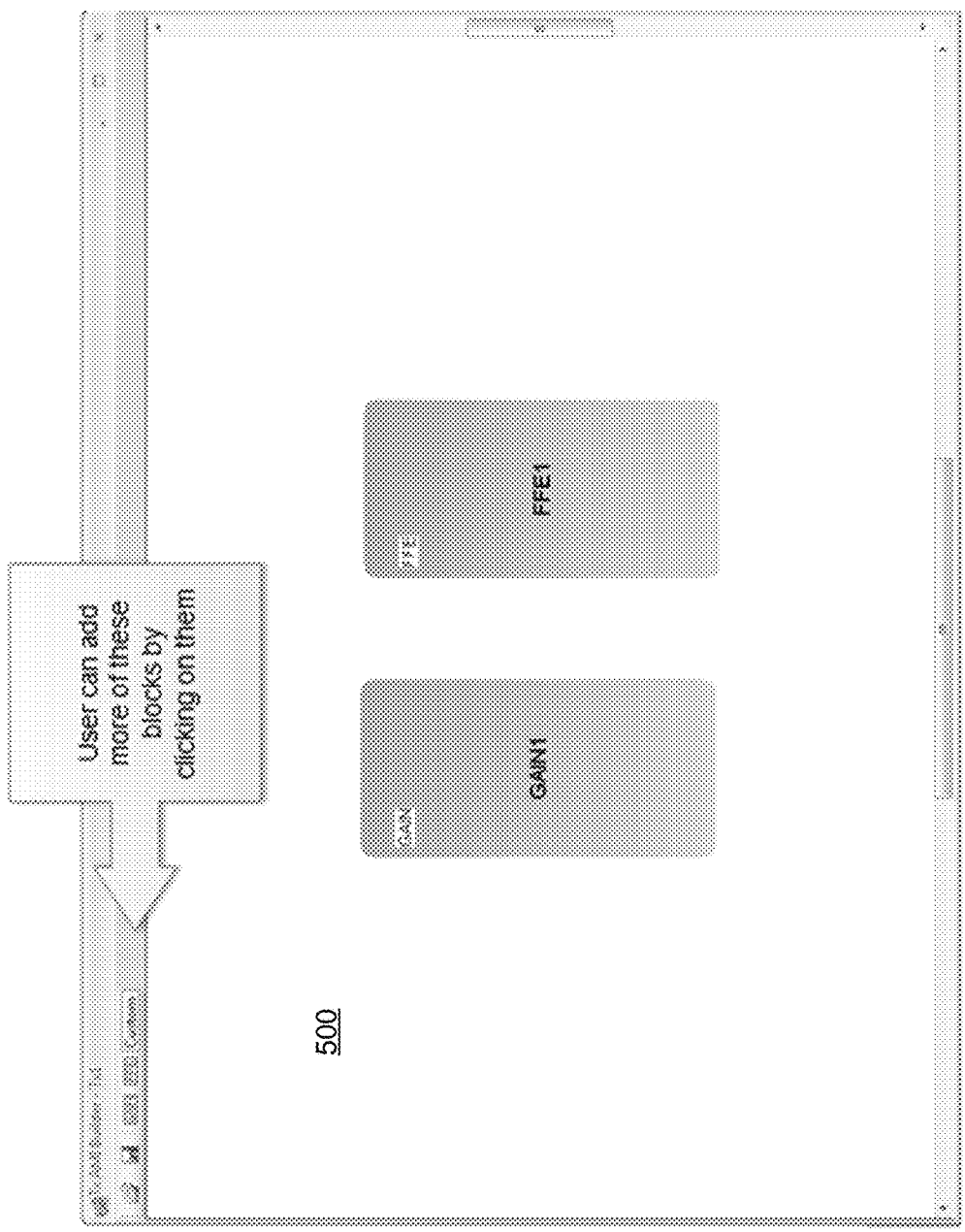
FIG. 5 is a schematic depicting aspects of the AMI process in accordance with an embodiment of the present disclosure.

FIG. 5 depicts an example of a GUI 500 consistent with embodiments of AMI process 10. This particular example shows a Tx AMI Builder GUI. In some embodiments, GUI 500 may allow a user to select various templates or modules such as the FFE and GAIN examples provided in FIG. 5. Accordingly, AMI process 10 may allow a user to select from a plurality of templates associated with an advanced equalization algorithm at a GUI 500. AMI process 10 may receive the user's selection a template at GUI 500 and may display the selected template, in this example, the GAIN and FFE templates have been selected. As is shown in the Figure, a user may add more of these modules if desired.

Figure 6:
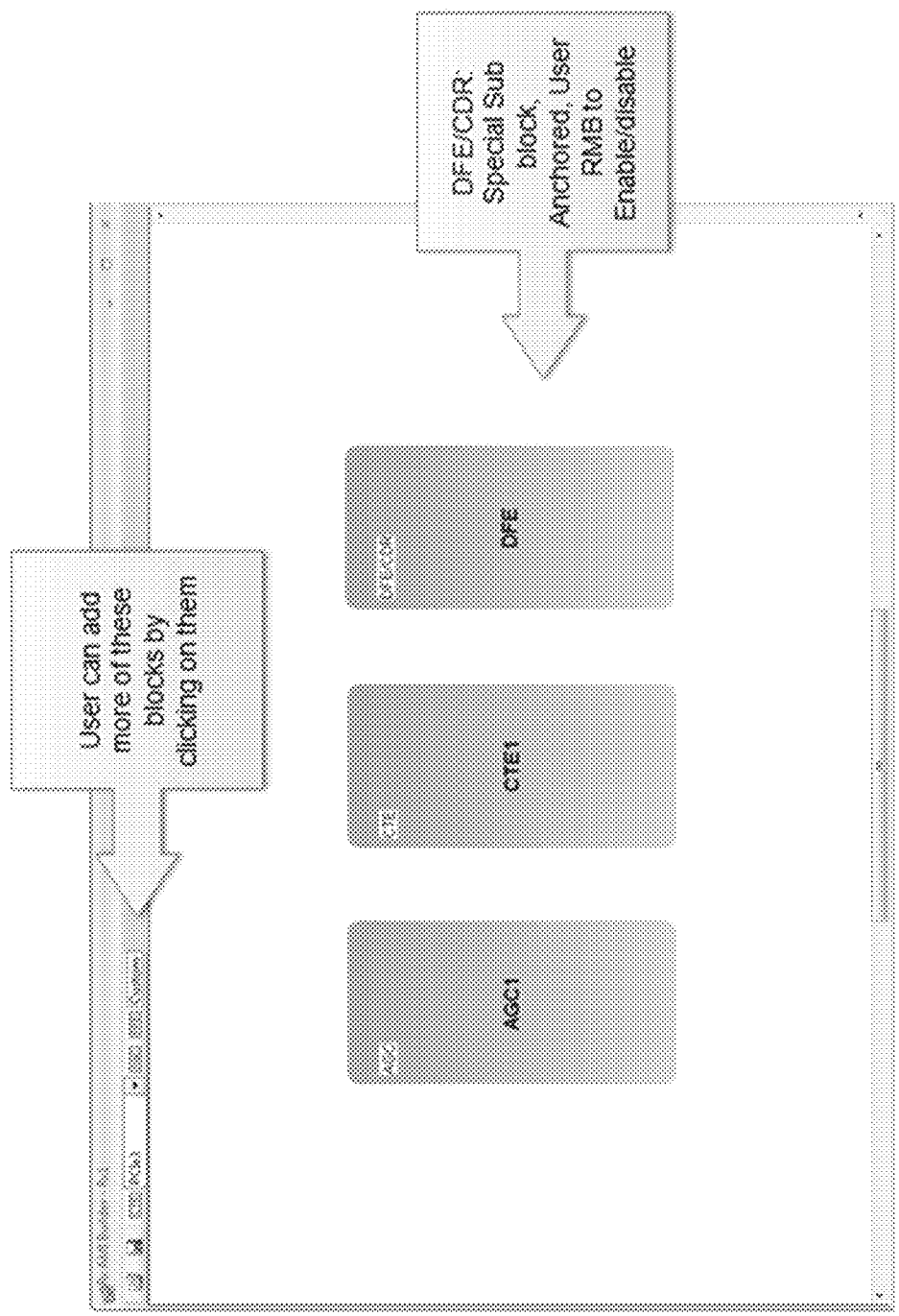
FIG. 6 is a schematic depicting aspects of the AMI process in accordance with an embodiment of the present disclosure.

FIG. 6 depicts an example of a GUI 600 consistent with embodiments of AMI process 10. This particular example shows a Rx AMI Builder GUI. In some embodiments, GUI 600 may allow a user to select various templates or modules such as the analog gain control ("AGC"), continuous time equalization ("CTE1"), and decision feedback equalization ("DFE") examples provided in FIG. 6. As is shown in the Figure, a user may add more of these modules upon selection. In some embodiments, multiple AGC/and/or CTE blocks may be displayed on the canvas. AMI process 10 may allow for the removal of a particular template or module once added. Additionally and/or alternatively, selecting a particular module (e.g. by double clicking) may open the parameters for that specific block. In this way, the AMI Builder discussed herein may share a toolbar with other EDA application features, including, but not limited to, those available from the Assignee of the present disclosure.

Figure 7:
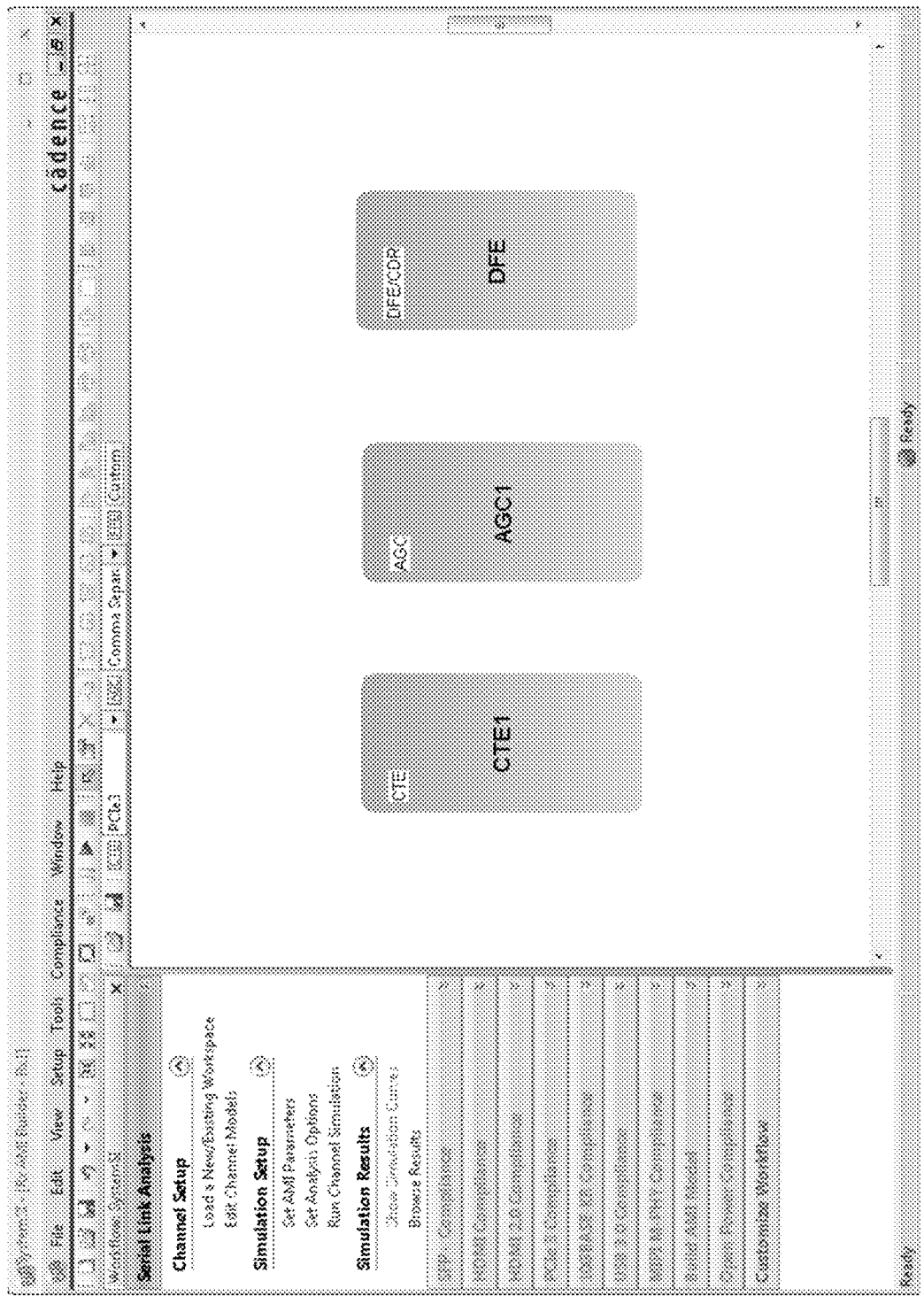
FIG. 7 is a schematic depicting aspects of the AMI process in accordance with an embodiment of the present disclosure.

Referring also to FIG. 7, an additional embodiment of an RX AMI Builder GUI 700 is provided. As discussed above, AMI process 10 may be configured to display the AMI model at graphical user interface 700. In some embodiments, the process may include generating an algorithmic modeling interface file based upon, at least in part, the selected template and/or module and the one or more parameters. In this particular example, the left side of FIG. 7 depicts the workflow available via an EDA application. The workflow is a quick way of walking through the steps needed for an analysis project. In some embodiments, AMI Builder may also be launched from the workflow by selecting a 'Build AMI Model' option. Any AMI model that is created via this method may not be associated with a particular Tx or Rx.

Accordingly, AMI process 10 may allow a user to focus upon the architecture without undergoing time consuming code writing. In some embodiments, architecture specific templates may be stored for future reuse. AMI process 10 also allows user to load and edit templates for different models and may allow for model generation automatically, for example, upon receiving an indication from the user.

In some embodiments, the user may be allowed to compile and generate an AMI model (.dll) upon user selection AMI process 10 may be configured to write the required code automatically based on the selections from the user in any language (e.g., 'C' programming language, etc.), call the compiler that may be present on the user's computer and compile the .dll based on the user's platform and operating system. Accordingly, the user does not have to look at any compiler (e.g., Visual Studio) to setup/compile the AMI model.

In some embodiments, AMI process 10 may utilize a number of parameterized algorithms. Some of these may include, but are not limited to, a) CT(L)E/AGC/VGA: these filters can be represented in the following forms—Pole/Zero, Laplace, Time Domain Step, Time Domain Narrow Pulse, Magnitude/Phase or Real/Imaginary, b) CDR (Clock Data Recovery): the CDR can be implemented as Early/Late with Dynamic on/off and Jitter injection, c) Adaptation for Modules: adaptation can be achieved using on the time/horizontal scale (early/late) or on the voltage/vertical scale (Eye sampler). Adaptation is also available for VGA and CTE and is tightly integrated with the DFE, d) DFE: the DFE in AMI Builder can use Least Mean Square (LMS) algorithm and can operate in repeater mode. Users can apply Tap limits/Quantization to the DFE taps. CDRs can be pre or post dfe, e) FFE: FFE in AMI Builder can operate using the LMS auto optimization or Non-linear auto optimization. Users can apply Tap limits/Quantization to the FFE taps. AMI Builder also provides Tx/Rx Backchannel Support: (In Rx: Early/late or eye sampler for backchannel, In Tx: Ability to modify taps based on Rx feedback).

Figure 8:
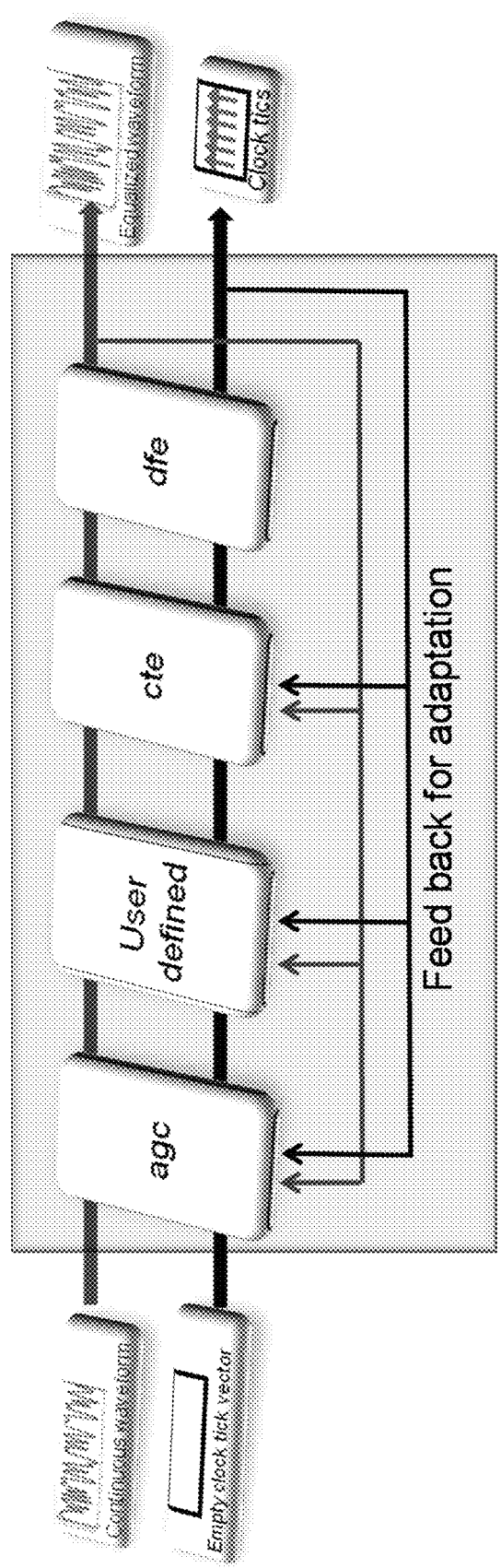
FIG. 8 is a schematic depicting aspects of the AMI process in accordance with an embodiment of the present disclosure.

Referring also to FIG. 8, an embodiment depicting an example algorithmic model IP library 800 that may be used in accordance with AMI process is provided. As discussed herein, this particular configuration provides a high level of architectural abstraction as well as an extremely powerful and flexible backend in communication with an easy to use user-facing graphical user interface.

Figure 9:
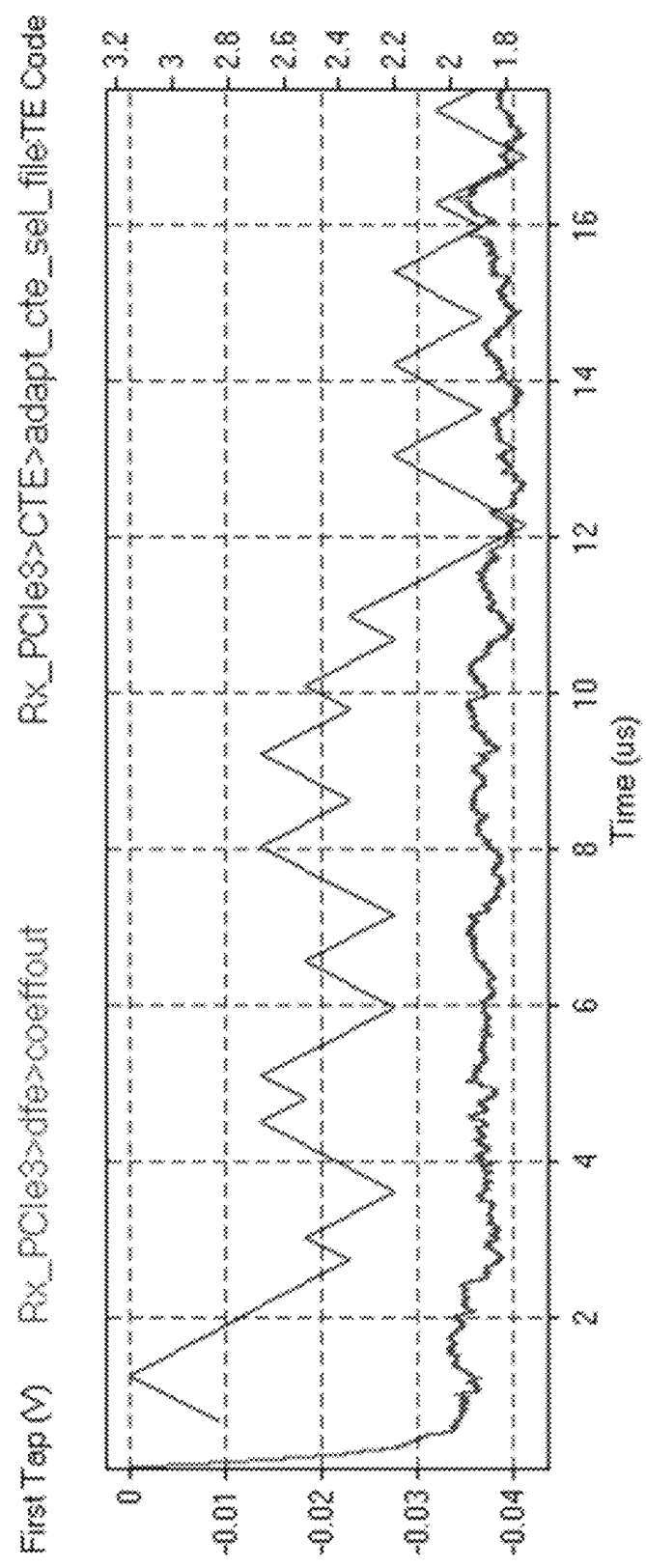
FIG. 9 is a schematic depicting aspects of the AMI process in accordance with an embodiment of the present disclosure.
Figure 10:
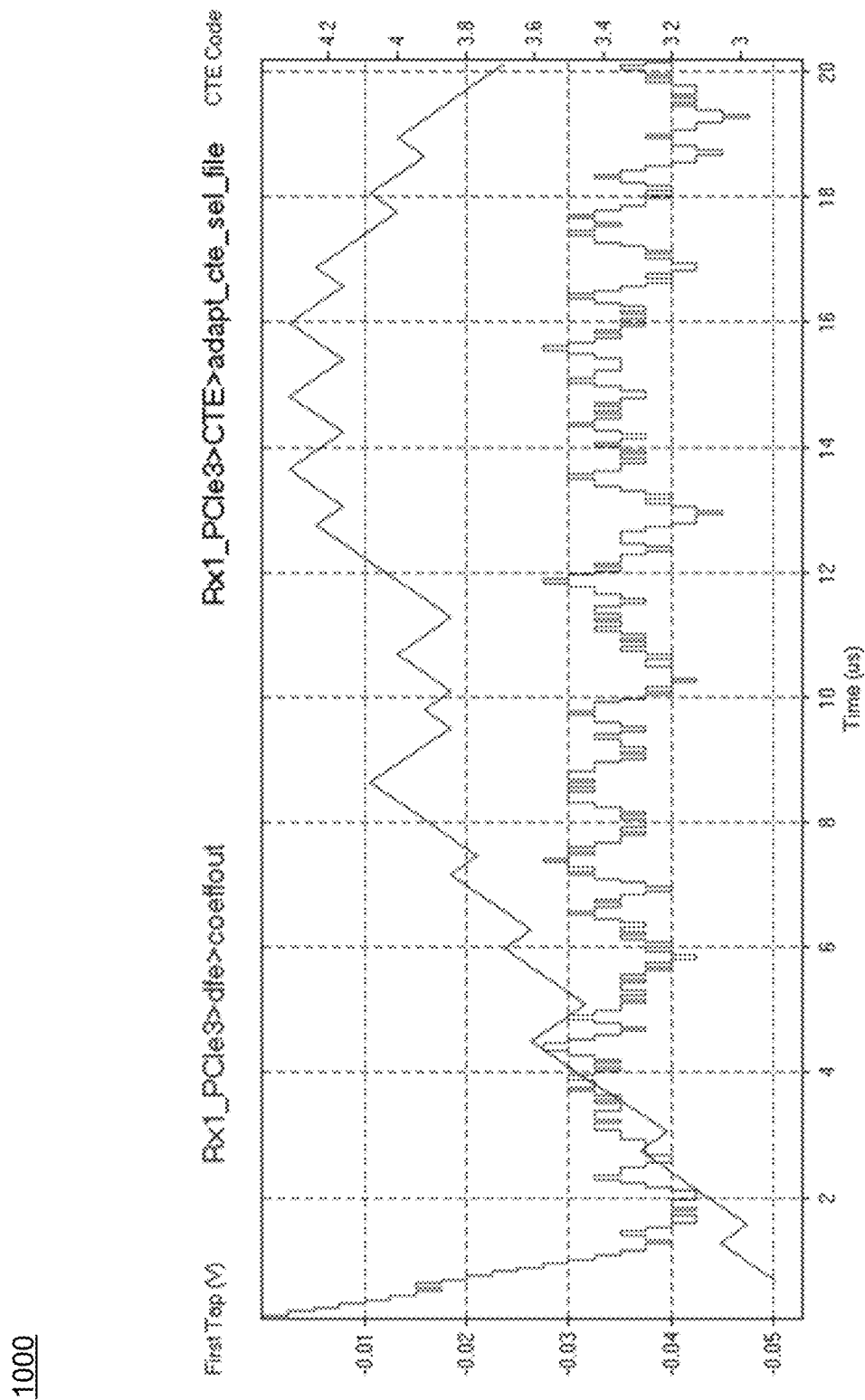
FIG. 10 is a schematic depicting aspects of the AMI process in accordance with an embodiment of the present disclosure.
Figure 11:
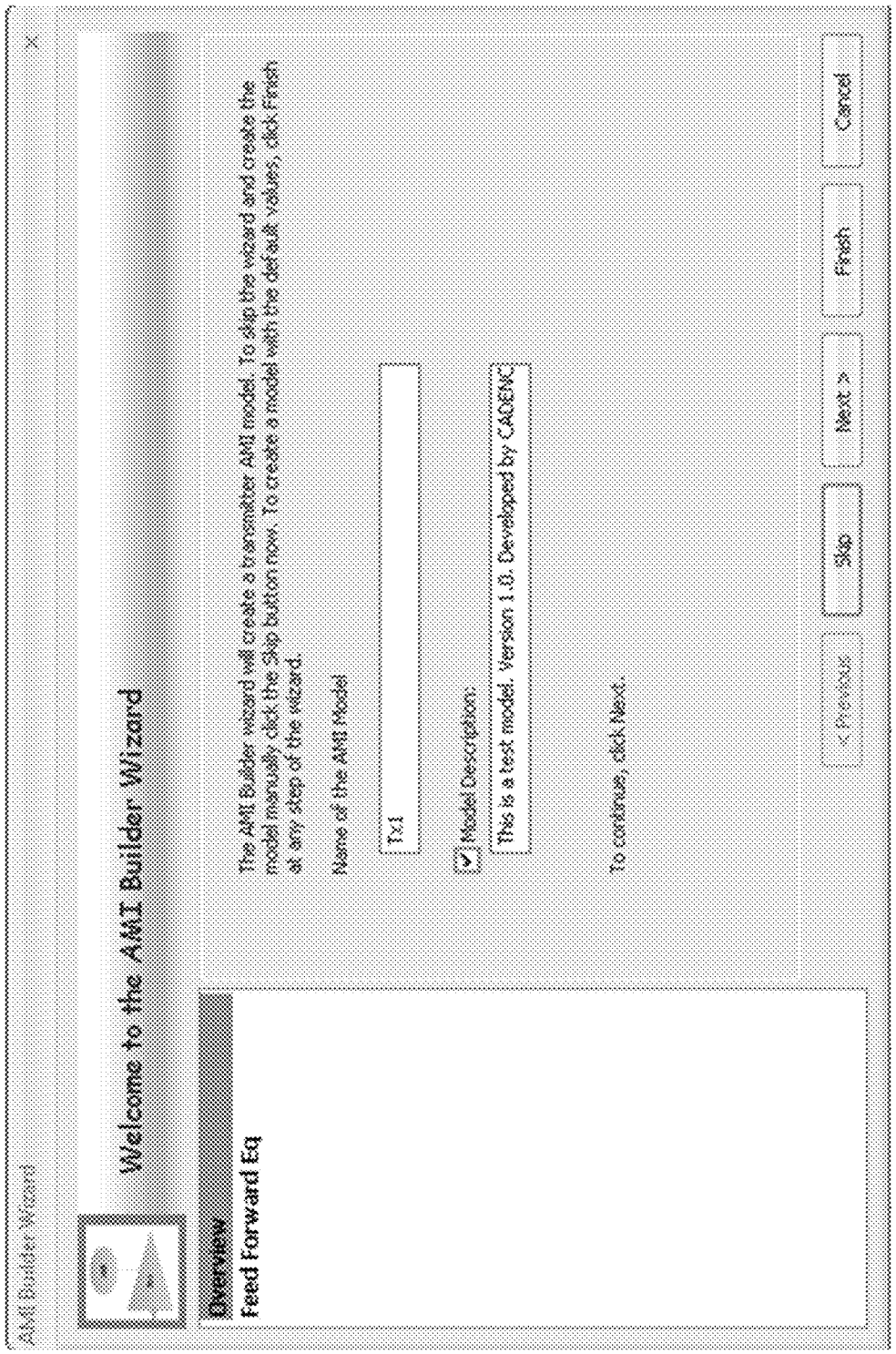
FIG. 11 is a schematic depicting aspects of the AMI process in accordance with an embodiment of the present disclosure.

FIGS. 9-10 depict examples of graphical results that may be generated in accordance with AMI process 10. AMI Builder generates AMI Models which may have adaptation algorithms in them. These adaptation algorithms (e.g., block level) may be dependent upon other adaptation routines taking place (e.g., in other blocks) and may also be dependent on factors such as rate, mode and style of adaptation. When these models are run in an EDA application, real time plots of how the adaptation progresses and interacts with other adaptations in real-time may be made available to the user. These plots may be helpful in ascertaining whether the algorithms in the AMI Models are behaving as per the users or model designer's expectation. If required, the user or designer may change parameters for resolution or algorithms for adaptation and/or filtering to fine tune the behavior of the simulation.

Referring now to FIGS. 11-20, embodiments of AMI process depicting an AMI-based wizard 1100 are provided. Accordingly, and as shown, AMI process 10 may be configured to display an AMI-based wizard 1100 at a graphical user interface associated with the user's computing device. In some embodiments, AMI-based wizard 1100 may be configured to ask questions to the user and may be supported by an engine in the backend (e.g. at server computing device 12) that may translate those questions into AMI model (.dll) and its companion file (.ami) containing its parameter settings.

As discussed above, this may occur without ever writing one line of code. The AMI-based wizard 1100 may operate in conjunction with and/or as part of AMI process 10 to help reduce any complications there may be in developing AMI models and requires both no prior knowledge of tools or programming ability. AMI-based wizard 1100 may allow a novice with no prior knowledge of any AMI/IBIS construct, EDA tools and/or programming ability to be able to answer extremely simple questions to develop an AMI model in-house. Accordingly, the AMI-based wizard and AMI builder associated with AMI process 10 may increase efficiency and drastically reduce model development time.

In some embodiments, AMI process 10 may shield the user from complex scenarios such as mutually exclusive situations, adaptation algorithms and related parameters and dependency among various parameters. In this way, the user may answer basic architecture level questions via AMI-based wizard 1100 and the AMI engine may perform the rest. Accordingly, the user may maneuver back and go forward/skip modules by a click of a button allowing for a flexible environment. If the user prefers, the AMI Builder canvas and options are also available if desired. The user can compile and generate an AMI model (e.g., .dll) with the click of a button as is shown in further detail below.

Figure 12:
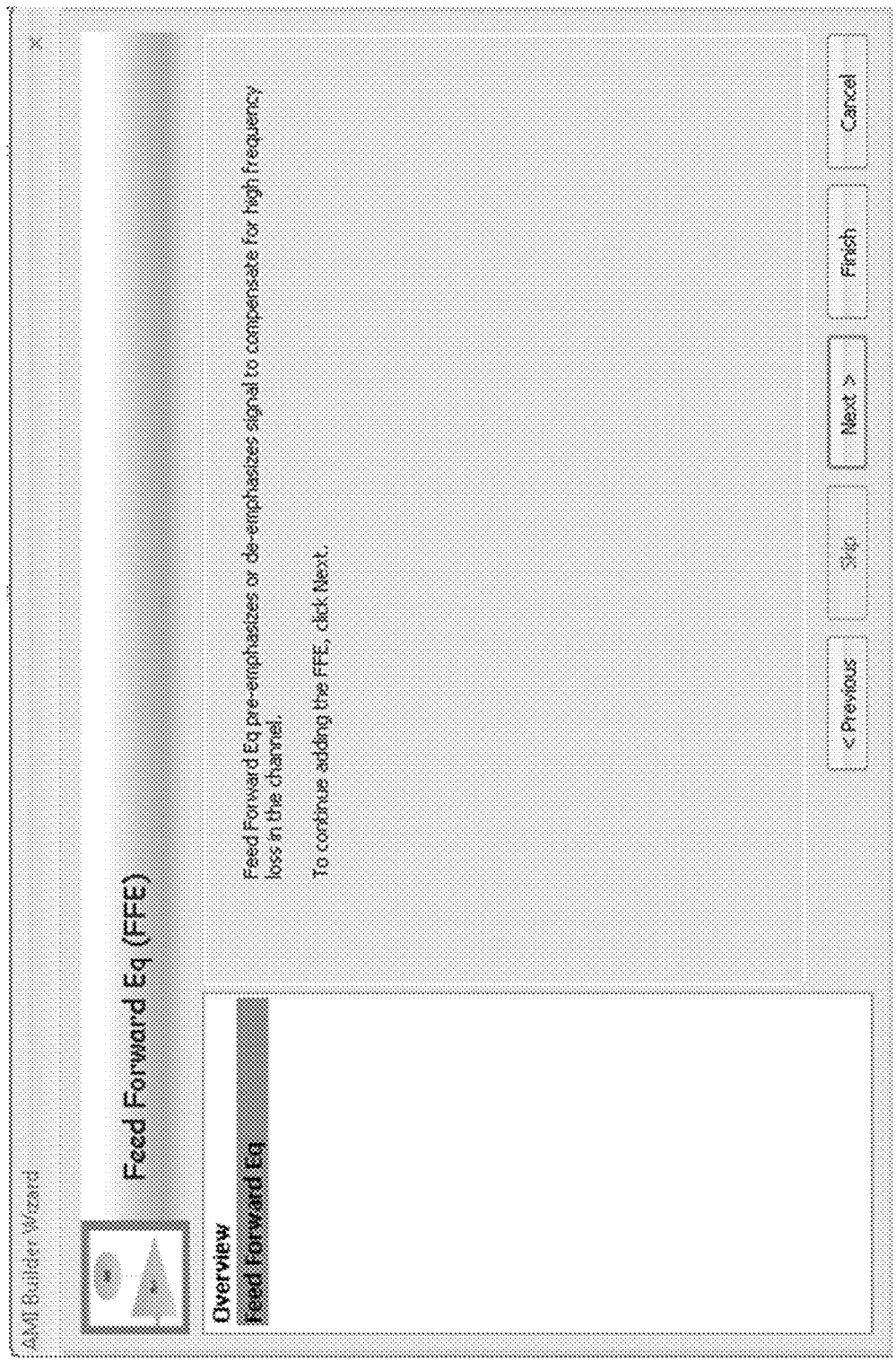
FIG. 12 is a schematic depicting aspects of the AMI process in accordance with an embodiment of the present disclosure.

Referring again to FIG. 11, an AMI-based wizard 1100 configured to allow for the generation of a transmitter AMI model is provided. In operation, if the user does not wish to use the wizard he/she may select the "skip" option, which will bypass the wizard and bring the user back to the AMI Builder GUI. FIG. 12 depicts an AMI-based wizard 1200 configured to allow the user to add feed forward equalization to the AMI model. Feed forward equalization may pre-emphasize or de-emphasize a signal to compensate for high frequency loss in the channel.

Figure 13:
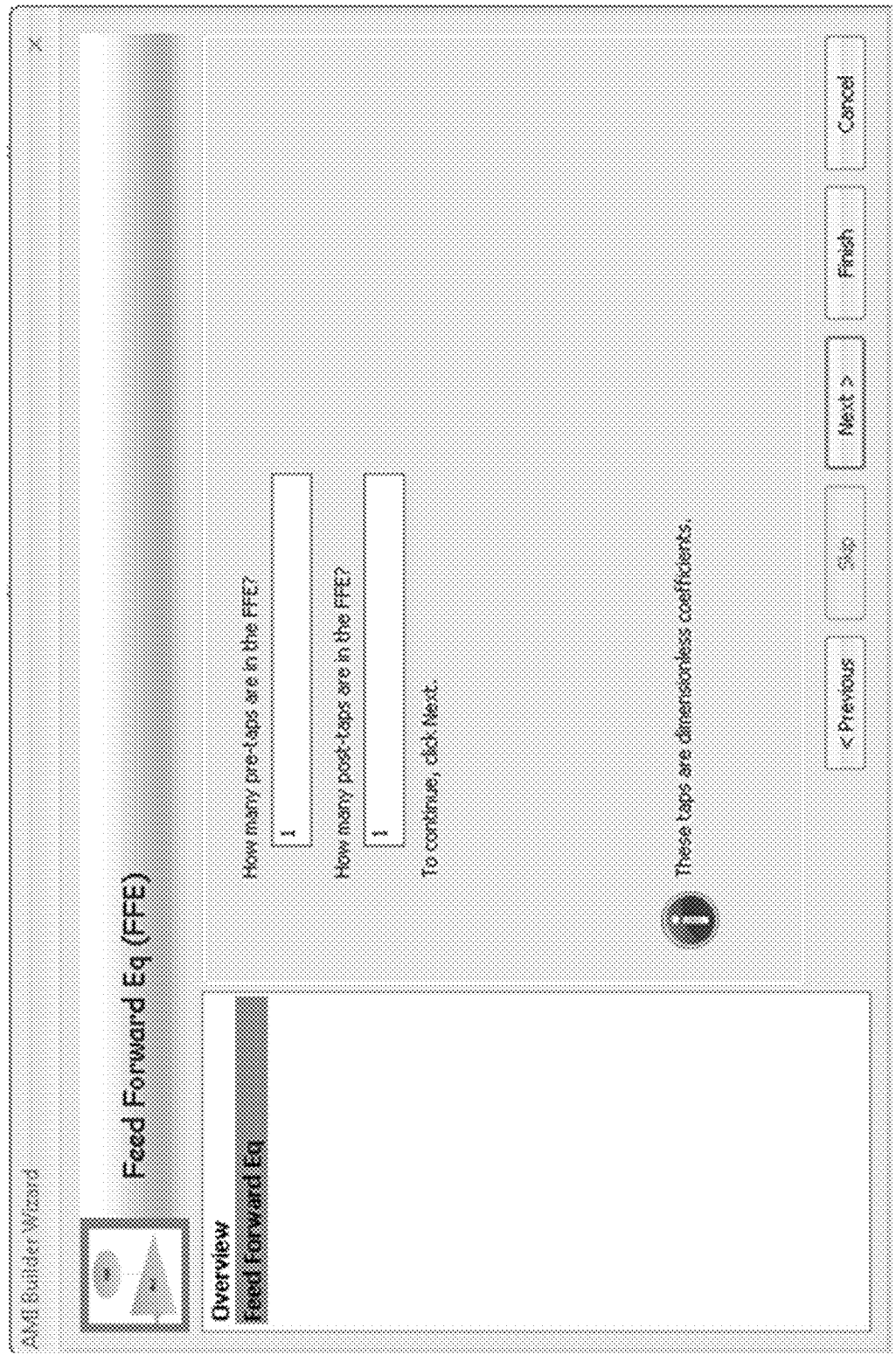
FIG. 13 is a schematic depicting aspects of the AMI process in accordance with an embodiment of the present disclosure.
Figure 14:
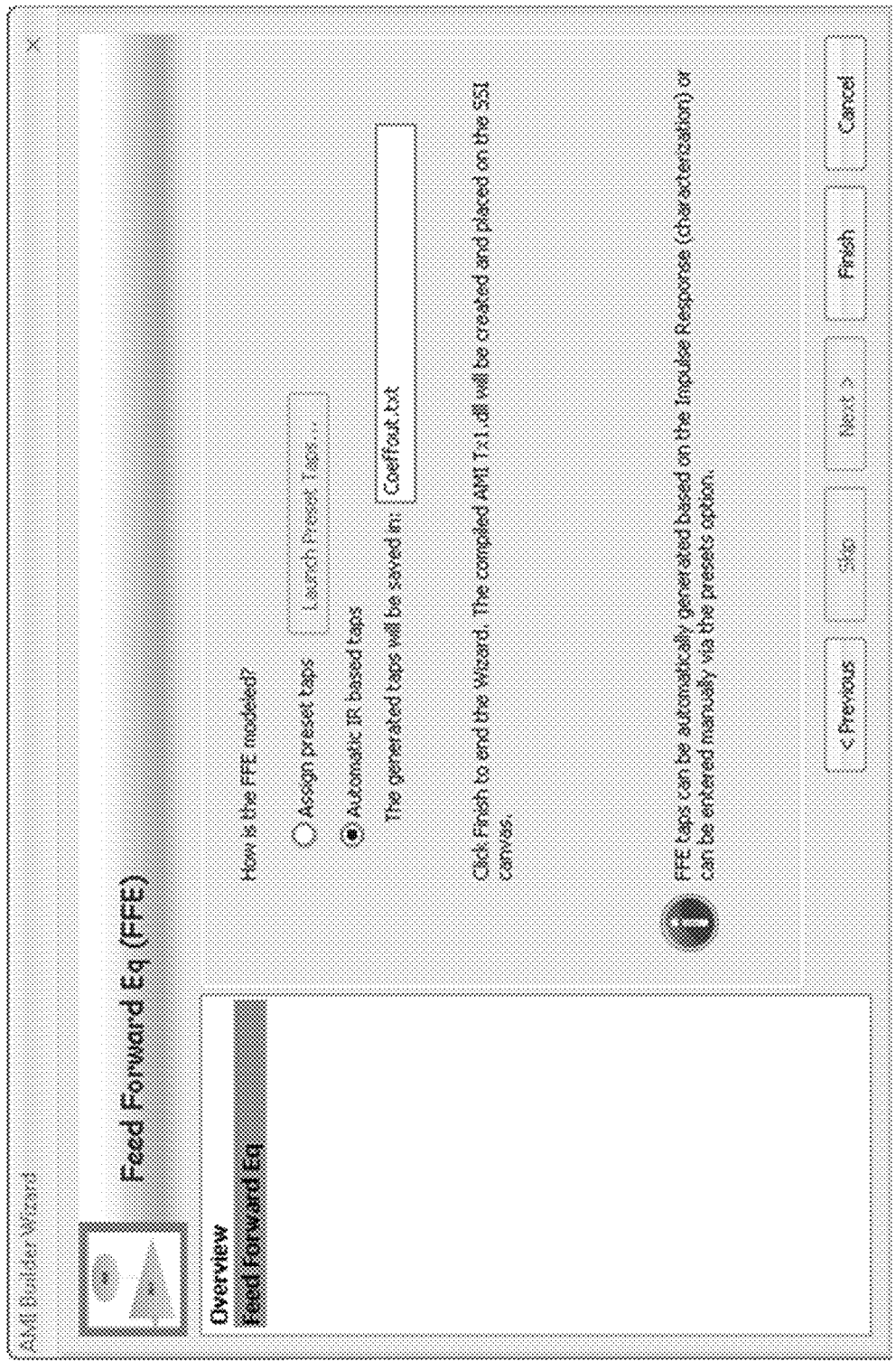
FIG. 14 is a schematic depicting aspects of the AMI process in accordance with an embodiment of the present disclosure
Figure 15:
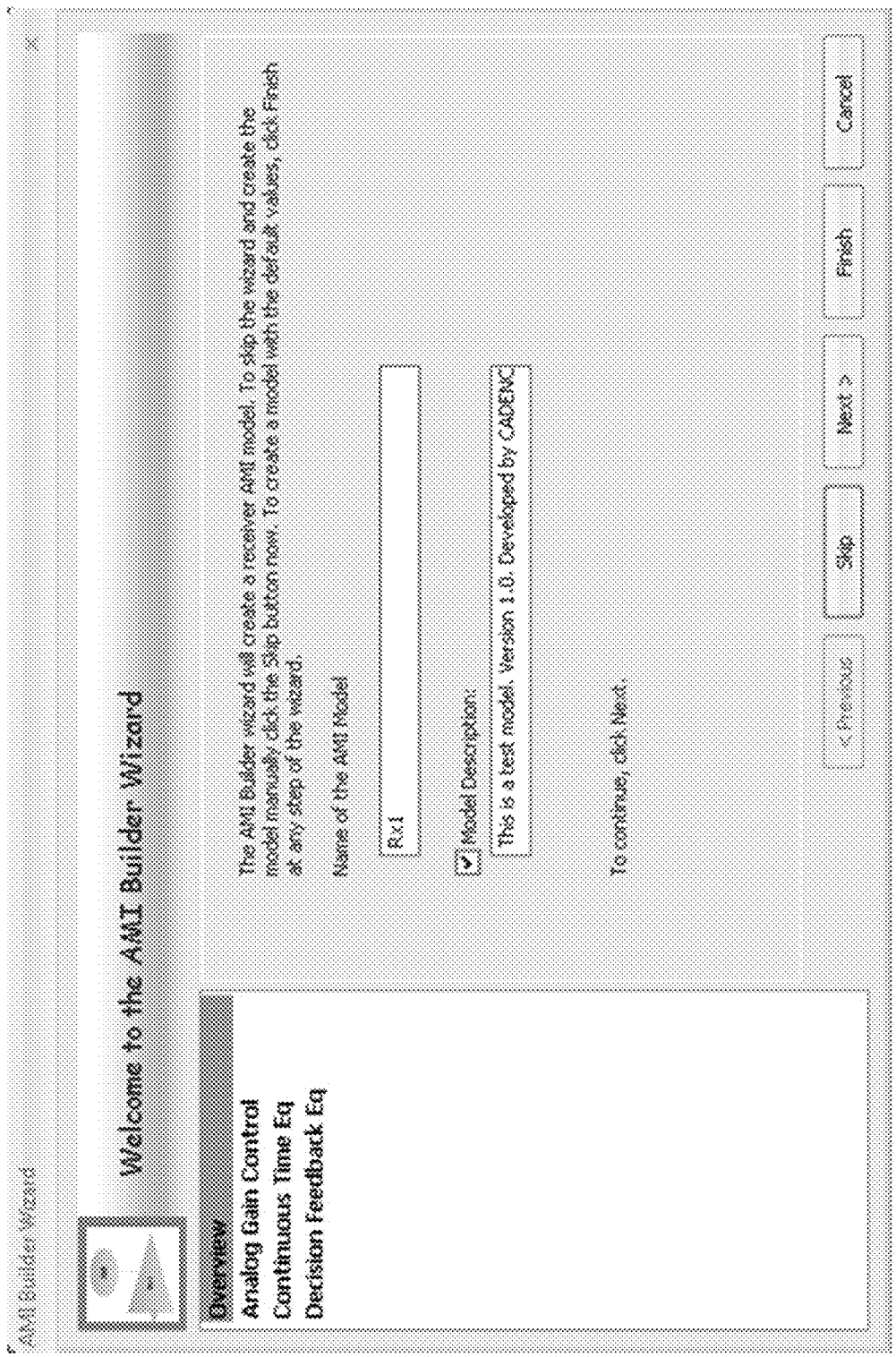
FIG. 15 is a schematic depicting aspects of the AMI process in accordance with an embodiment of the present disclosure.

Referring also to FIGS. 13-14, embodiments of the AMI-based wizard showing various FFE operations are provided. FIG. 13 depicts a GUI 1300, which presents questions related to the number of pre-taps and post-taps in the FFE. Once these questions are answered, the AMI process may proceed to the GUI 1400 shown in FIG. 14. As is shown in FIG. 14, AMI-based wizard 1400 may automatically generate FFE taps based upon the impulse response (characterization) or may be entered manually via the presets option depicted on AMI-based wizard 1400.

Figure 16:
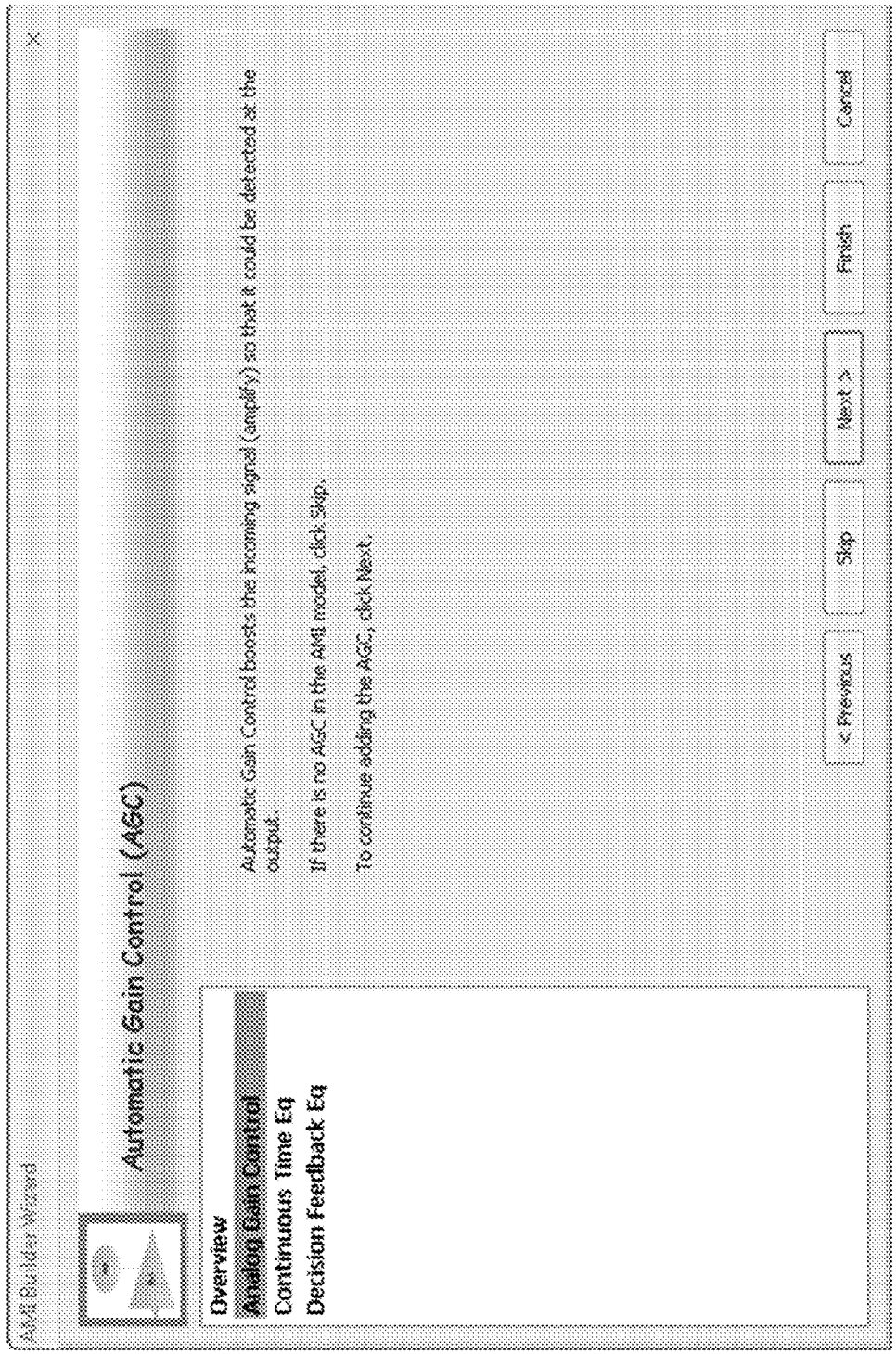
FIG. 16 is a schematic depicting aspects of the AMI process in accordance with an embodiment of the present disclosure.

Referring now to FIGS. 15-19, embodiments of AMI process 10 depicting GUIs configured to allow for the generation of a receiver AMI model is provided. Again, if the user does not wish to use the wizard he/she may select the "skip" option, which will bypass the wizard and bring the user back to the AMI Builder GUI. FIG. 16 depicts an AMI-based wizard 1600 configured to allow the user to add analog gain control to the AMI model. Analog gain control may boost the incoming signal (amplify) so that it may be detected at the output. The user is given the option to skip this step if there is no analog gain control in this particular AMI model.

Figure 17:
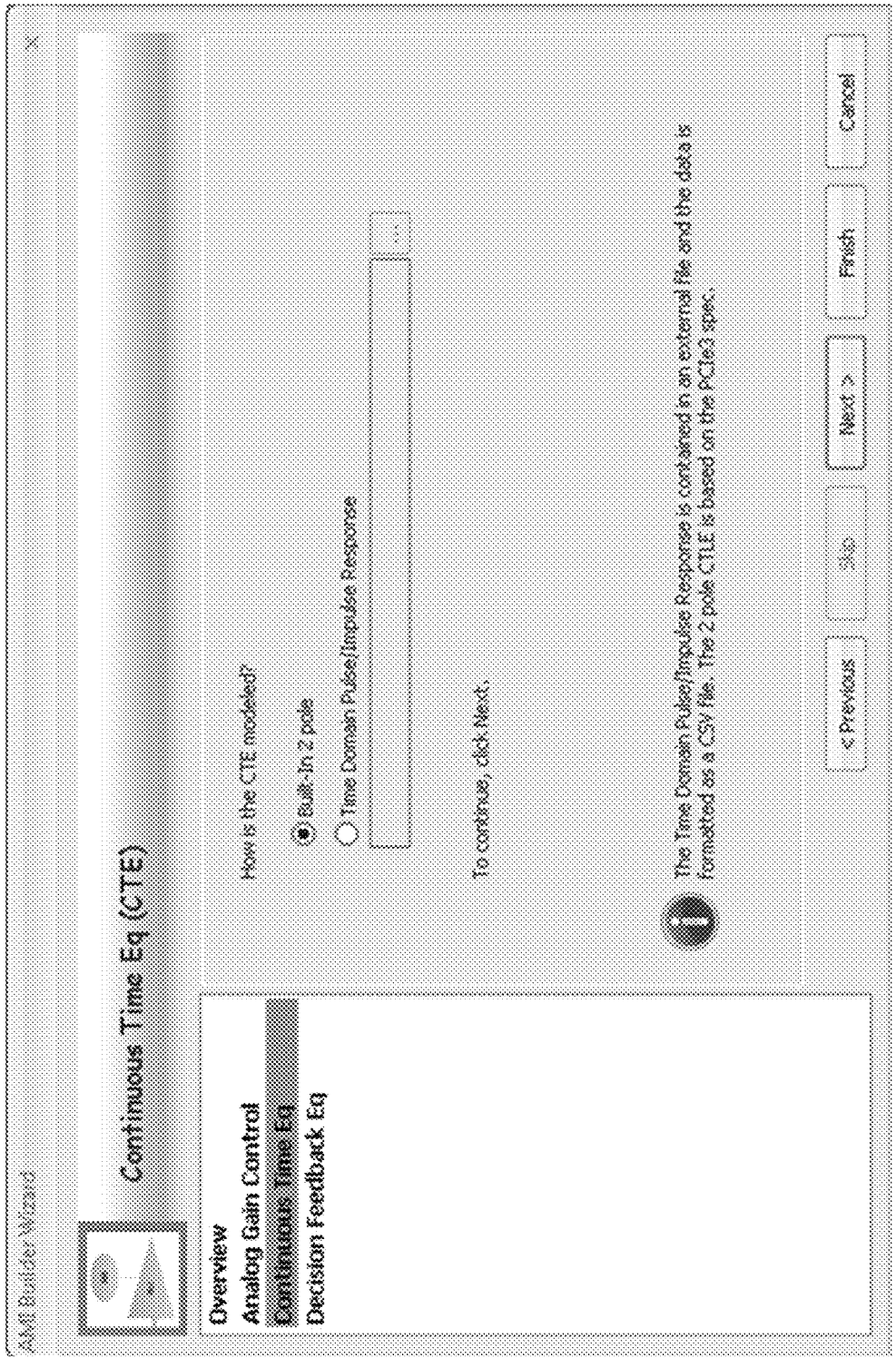
FIG. 17 is a schematic depicting aspects of the AMI process in accordance with an embodiment of the present disclosure.

Referring now to FIG. 17, an embodiment of AMI process 10 depicting a continuous time equalization (CTE) graphical user interface 1700 is provided. In operation, the user may be asked to select between a built-in 2 pole and time domain pulse/impulse response option. In some embodiments, the time domain pulse/impulse response may be contained in one or more external files and the data may be formatted as a csv file. The 2 pole CTE may be based on the PCIe3 specification. It should be noted that these are provided merely by way of example, as other file types and specifications may be used in accordance with the present disclosure.

Figure 18:
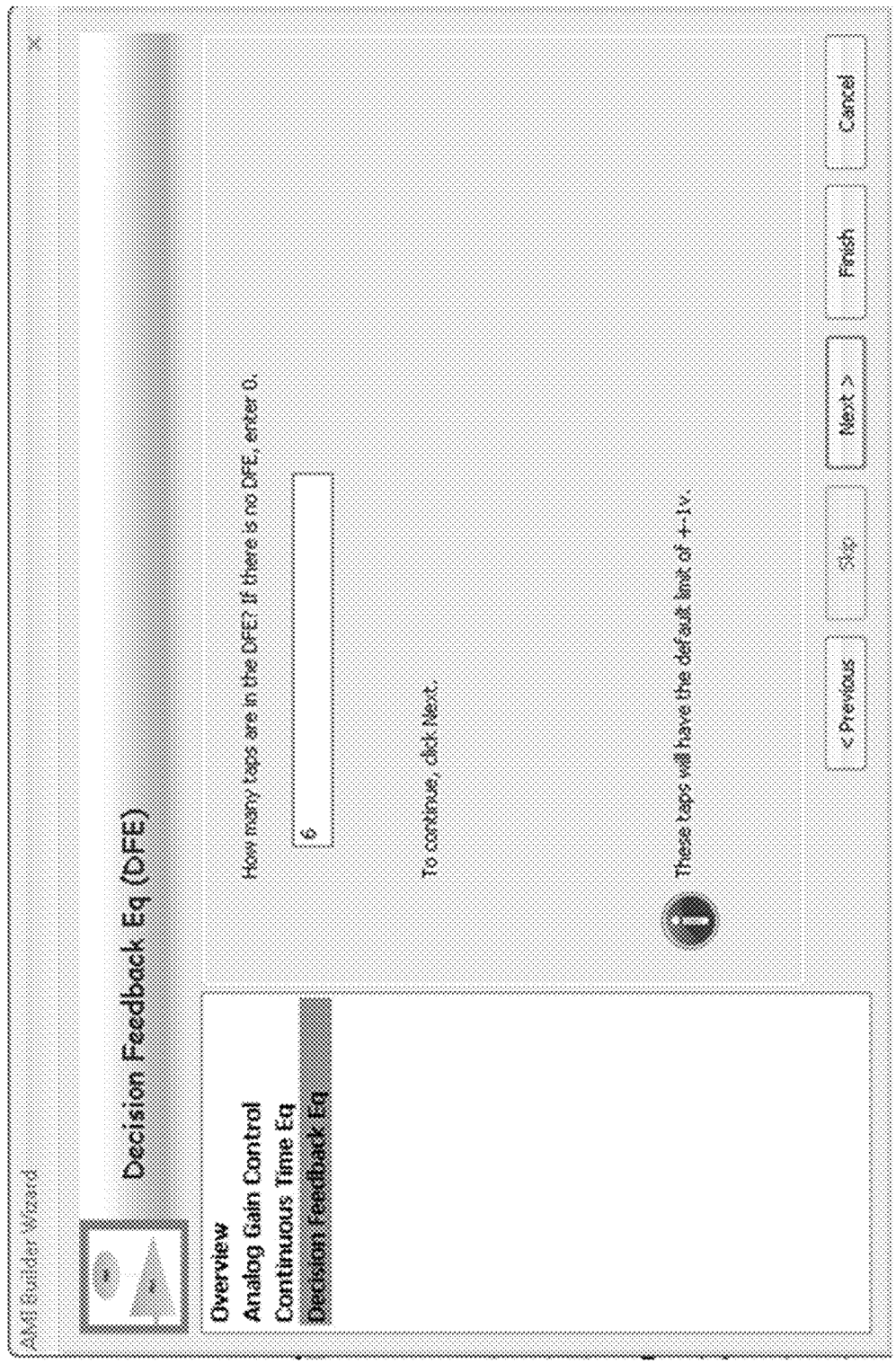
FIG. 18 is a schematic depicting aspects of the AMI process in accordance with an embodiment of the present disclosure.
Figure 19:
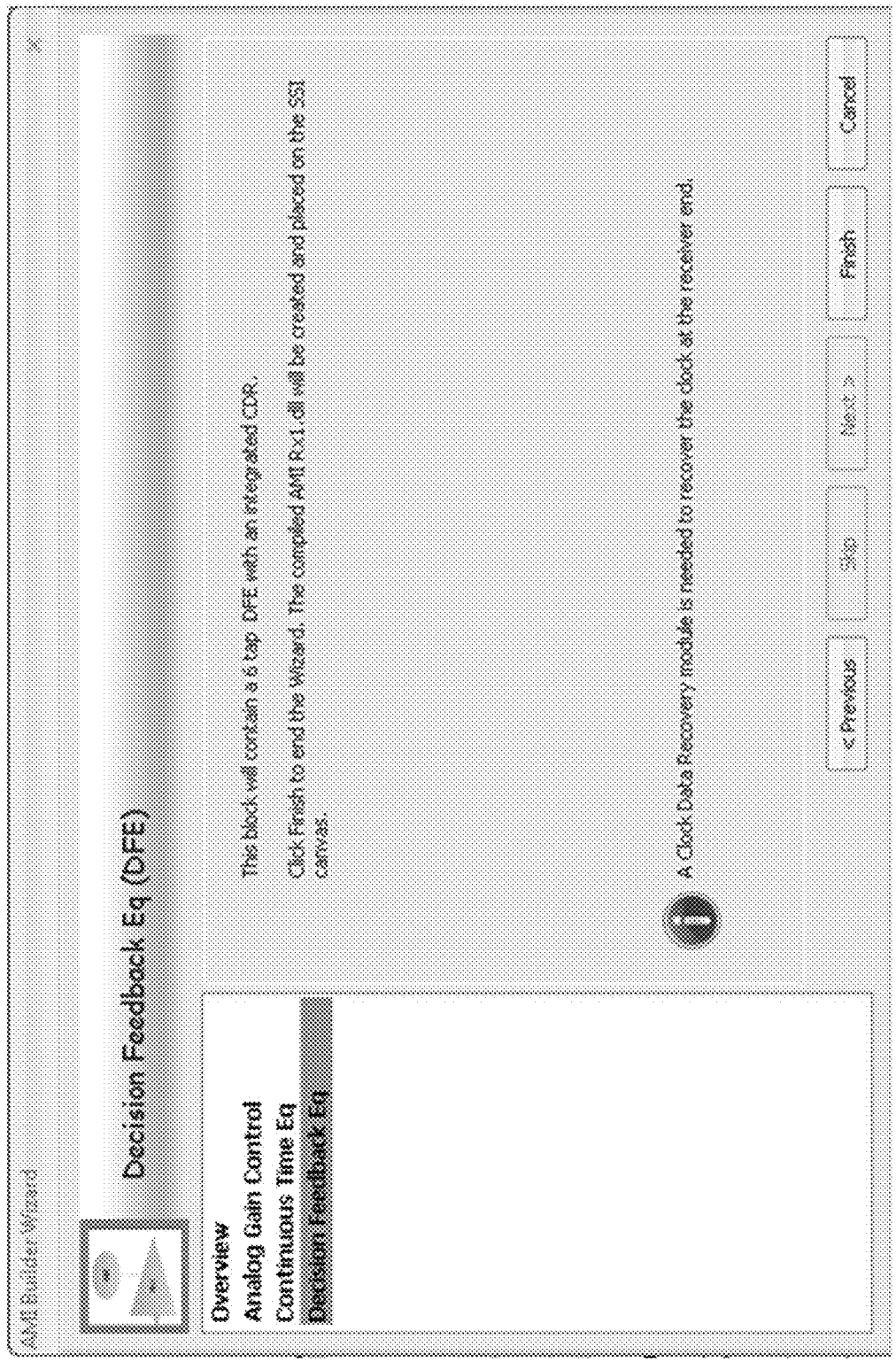
FIG. 19 is a schematic depicting aspects of the AMI process in accordance with an embodiment of the present disclosure.
Figure 20:
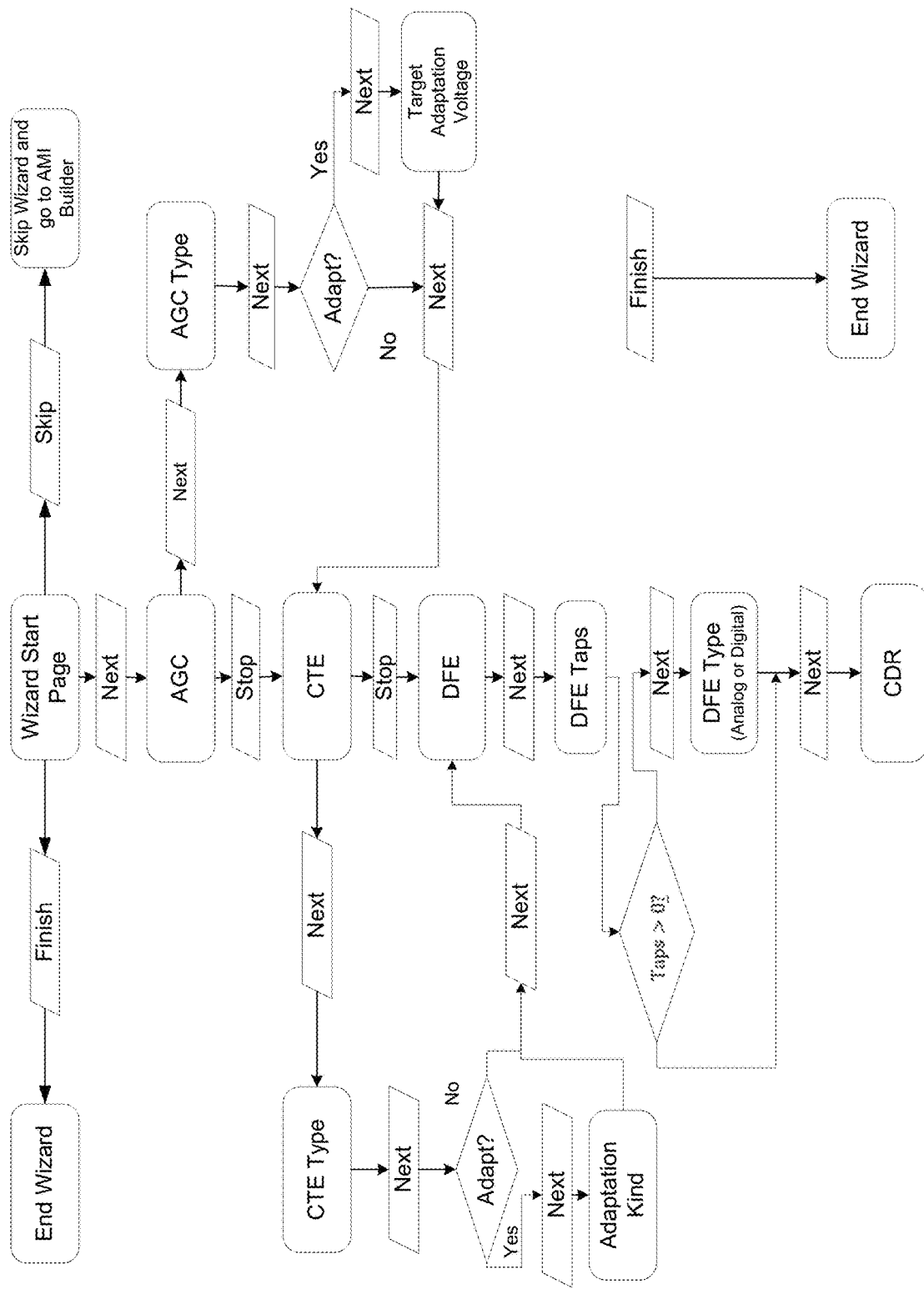
FIG. 20 is a schematic depicting aspects of the AMI process in accordance with an embodiment of the present disclosure.

Referring now to FIG. 18, an embodiment of AMI process 10 depicting a decision feedback equalization (DFE) graphical user interface 1800 is provided. In operation, the user may be asked to indicate how many taps are in the DFE. In some embodiments, the taps may include a default limit of +/−1V. In the example shown in FIG. 18, the user has indicated that this is a 6-tap DFE. FIG. 19 verifies that this is the case and shows that a 6-tap DFE will be included having an integrated clock and data recovery module ("CDR"). A clock data recovery module may be required in order to recover the clock at the receiver end. In operation, if the user selects the "finish" option, AMI process 10 may generate a compiled AMI RX1.dll, which may be placed on the EDA or client application canvas, for example those shown in FIG. 1. In this way, AMI process 10 may provide one or more user responses to an AMI-engine and may generate the AMI model taking into account the user responses. FIG. 20 depicts a flowchart 2000 showing one example associated with an embodiment of the AMI-based wizard.

In some embodiments, AMI process 10 may allow for an AMI Model (e.g., .dll) to be built by intelligently interpreting users answers to simple to understand questions. The AMI-based wizard may be configured to access a library of equalization schemes and algorithms and AMI IP building blocks. AMI process 10 may be configured to work with the library as it is updated with new modules. Accordingly, AMI process 10 may be configured to account for any change taking place in other blocks in a transparent and modularized manner.

The AMI-based wizard may be configured to operate with various EDA applications such as those available from the Assignee of the present disclosure, which may allow the user to perform numerous tests and/or simulations.

As discussed above, embodiments of AMI process 10 may allow the user to focus on architecture and not writing code. The user may save templates that can be reloaded in the GUI to make the same AMI model. AMI process 10 may also allow the user to load and then edit templates for different models. AMI process 10 provides a fast turnaround as the model may be generated at the click of a button as the AMI Builder may write structured code that complies with the latest IBIS AMI API. This may reduce bugs and errors and keeps the AMI Models up to date with the latest IBIS specifications. Additionally and/or alternatively, AMI process 10 may provide for tight integration with existing EDA applications, such as those available from the Assignee of the present disclosure and others, to allow for fast testing/demo. In some embodiments, the AMI models may be generated from such an EDA application canvas and may be placed on the canvas once they are created, thus allowing them to be tested in a fast and efficient manner. AMI process 10 also includes numerous debug outputs/tools in the AMI Builder allowing the user to debug any issue that may come up during model development/testing.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
    enabling, using one or more computing devices, a user to select from a plurality of templates associated with an advanced equalization algorithm at a graphical user interface, wherein each of the plurality of templates includes at least one graphical modules each representing analog gain control, continuous time equalization, or decision feedback equalization;
    receiving a selection of at least one of the plurality of templates at the graphical user interface;
    displaying the selected template and the at least one graphical modules included in the selected template at the graphical user interface and allowing a user to drag and place the selected template and the at least one graphical modules included in the selected template at a portion of the graphical user interface;
    storing and integrating a user-customized portion of code into the selected template such that an additional graphical module is displayed at the graphical user interface;
    allowing the user to edit one or more parameters associated with the at least one graphical modules included in the selected template and the additional graphical module at the graphical user interface; and
    automatically generating an algorithmic modeling interface ("AMI") model, including a dynamically linked library and associated code, based upon, at least in part, the selected template, the additional graphical module and the one or more parameters, wherein generating is based upon, at least in part, one or more results received from an AMI-engine, the results being based upon one or more answers provided by the user at the graphical user interface, wherein automatically generating the AMI model is based upon, at least in part, at least one of an analog gain control based algorithm, a continuous time equalization based algorithm, and a decision feedback equalization based algorithm.

2. The computer-implemented method of claim 1, further comprising:
    generating an AMI file based upon, at least in part, the selected template, the at least one graphical modules included in the selected template and the one or more parameters.

3. The computer-implemented method of claim 1, further comprising:
    storing an associated portion of code for each of the plurality of templates.

4. The computer-implemented method of claim 1, further comprising:
    allowing a user to edit the stored user-customized portion of code.

5. The computer-implemented method of claim 1, further comprising:
    displaying the algorithmic modeling interface ("AMI") model at the graphical user interface.

6. The computer-implemented method of claim 1, further comprising:
    displaying an AMI-based wizard at the graphical user interface.

7. The computer-implemented method of claim 6, wherein the AMI-based wizard is configured to present one or more questions to the user.

8. The computer-implemented method of claim 7, further comprising: providing one or more user responses to the AMI-engine.

9. The computer-implemented method of claim 8, wherein generating the algorithmic modeling interface ("AMI") model is based upon, at least in part, the one or more user responses.

10. A computer-readable storage medium having stored thereon instructions that when executed by a machine result in the following operations:
    enabling, using one or more computing devices, a user to select from a plurality of templates associated with an advanced equalization algorithm at a graphical user interface, wherein each of the plurality of templates includes at least one graphical modules each representing analog gain control, continuous time equalization, or decision feedback equalization;
    receiving a selection of at least one of the plurality of templates at the graphical user interface;
    displaying the selected template and the at least one graphical modules included in the selected template at the graphical user interface and allowing a user to drag and place the selected template and the at least one graphical modules included in the selected template at a portion of the graphical user interface;

storing and integrating a user-customized portion of code into the selected template such that an additional graphical module is displayed at the graphical user interface;

allowing the user to edit one or more parameters associated with the at least one graphical modules included in the selected template at the graphical user interface; and generating an algorithmic modeling interface ("AMI") model, including a dynamically linked library and associated code, based upon, at least in part, the selected template, the additional graphical module and the one or more parameters, wherein generating is based upon, at least in part, one or more results received from an AMI-engine, the results being based upon one or more answers provided by the user at the graphical user interface, wherein generating the AMI model is based upon, at least in part, at least one of an analog gain control based algorithm, a continuous time equalization based algorithm, and a decision feedback equalization based algorithm.

11. The computer-readable storage medium of claim 10, further comprising:

generating an AMI file based upon, at least in part, the selected template, the at least one graphical modules included in the selected template and the one or more parameters.

12. The computer-readable storage medium of claim 10, further comprising:

storing an associated portion of code for each of the plurality of templates.

13. The computer-readable storage medium of claim 10, further comprising:

allowing a user to edit the stored user-customized portion of code.

14. The computer-readable storage medium of claim 10, further comprising:

displaying the algorithmic modeling interface ("AMI") model at the graphical user interface.

15. The computer-readable storage medium of claim 10, further comprising:

displaying an AMI-based wizard at the graphical user interface, wherein the AMI-based wizard is configured to present one or more questions to the user.

16. A system comprising:

a computing device having at least one processor configured to enable a user to select from a plurality of templates associated with an advanced equalization algorithm at a graphical user interface, wherein each of the plurality of templates includes at least one graphical modules each representing analog gain control, continuous time equalization, or decision feedback equalization, the at least one processor further configured to receive a selection of at least one of the plurality of templates at the graphical user interface and to display the selected template and the at least one graphical modules included in the selected template at the graphical user interface and allow a user to drag and place the selected template and the at least one graphical modules included in the selected template at a portion of the graphical user interface, store and integrate a user-customized portion of code into the selected template such that an additional graphical module is displayed at the graphical user interface, the at least one processor further configured to allow a user to edit one or more parameters associated with the at least one graphical modules included in the selected template and the additional graphical module at the graphical user interface and to automatically generate an algorithmic modeling interface ("AMI") model, including a dynamically linked library and associated code, based upon, at least in part, the selected template and the one or more parameters, wherein generating is based upon, at least in part, one or more results received from an AMI-engine, the results being based upon one or more answers provided by the user at the graphical user interface, wherein automatically generating the AMI model is based upon, at least in part, at least one of an analog gain control based algorithm, a continuous time equalization based algorithm, and a decision feedback equalization based algorithm.

17. The system of claim 16, wherein the at least one processor is further configured to generate an AMI file based upon, at least in part, the selected template, the at least one graphical modules included in the selected template and the one or more parameters.

18. The system of claim 16, wherein the at least one processor is further configured to execute one or more instructions to store an associated portion of code for each of the plurality of templates.

* * * * *